(12) United States Patent
Shibata et al.

(10) Patent No.: US 12,479,490 B2
(45) Date of Patent: Nov. 25, 2025

(54) WORKING MACHINE

(71) Applicant: Makita Corporation, Anjo (JP)

(72) Inventors: Yoshinori Shibata, Anjo (JP); Susumu Kato, Anjo (JP); Yasuo Ifuku, Anjo (JP); Yuta Nakamura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 645 days.

(21) Appl. No.: 17/942,282

(22) Filed: Sep. 12, 2022

(65) Prior Publication Data

US 2023/0097550 A1      Mar. 30, 2023

(30) Foreign Application Priority Data

Sep. 24, 2021   (JP) ................................. 2021-155553

(51) Int. Cl.
  *B62B 3/00*   (2006.01)
  *B62B 5/00*   (2006.01)
  *B62B 5/04*   (2006.01)
(52) U.S. Cl.
  CPC .............. *B62B 5/0069* (2013.01); *B62B 3/00* (2013.01); *B62B 5/0438* (2013.01); *B62B 5/0033* (2013.01)
(58) Field of Classification Search
  CPC ....... B62B 5/0069; B62B 3/00; B62B 5/0438; B62B 5/0033; B62B 5/06; B62B 3/002
  (Continued)

(56) References Cited

U.S. PATENT DOCUMENTS 12,122,441 B2 * 10/2024 An ..................... B62B 5/0069
2016/0107718 A1 * 4/2016 O Connell ............... B60T 1/04
                                                188/24.11
(Continued)

FOREIGN PATENT DOCUMENTS

DE   102020004190 A1 *  2/2021 ............... B62B 3/02
JP       59-14766 U      1/1984
(Continued)

OTHER PUBLICATIONS

DE202020002216u1 accessed at www.espacenet.com on May 31, 2025. (Year: 2020).*

(Continued)

*Primary Examiner* — James A Shriver, II
*Assistant Examiner* — Hilary L Johns
(74) *Attorney, Agent, or Firm* — Sughrue Mion, PLLC

(57) ABSTRACT

A working machine may include a first ground-contact part, a driving part configured to drive the first ground-contact part, a clutch mechanism configured to be switched between a transmission state and a non-transmission state, a clutch operation part configured to switch a state of the clutch mechanism, a braking mechanism configured to be switched between a braking state and a non-braking state, and a braking operation part configured to switch a state of the braking mechanism. In a case where the state of the braking mechanism is the braking state, the clutch mechanism may be switched from the transmission state to the non-transmission state by operating the clutch operation part, and in a case where the state of the braking mechanism is the non-braking state, the clutch mechanism may not be switched from the transmission state to the non-transmission state even by operating the clutch operation part.

10 Claims, 21 Drawing Sheets

(58) Field of Classification Search
USPC .......................................................... 180/332
See application file for complete search history.

(56) References Cited

U.S. PATENT DOCUMENTS

| | | | |
|---|---|---|---|
| 2018/0215404 A1* | 8/2018 | Hayashi | B62B 5/004 |
| 2022/0289263 A1* | 9/2022 | An | B62B 5/0069 |
| 2023/0174130 A1* | 6/2023 | Shibata | B62B 5/0033 |
| | | | 180/19.1 |

FOREIGN PATENT DOCUMENTS

| | | |
|---|---|---|
| JP | 62-194180 U | 12/1987 |
| JP | 63-125472 A | 5/1988 |
| JP | 3-118123 U | 12/1991 |
| JP | 10-094561 A | 4/1998 |

OTHER PUBLICATIONS

Communication dated Apr. 1, 2025, issued in Japanese Application No. 2021-155553.

\* cited by examiner

WORKING MACHINE

CROSS-REFERENCE TO RELATED APPLICATION

This application claims priority to Japanese Patent Application No. 2021-155553 filed on Sep. 24, 2021, the contents of which are hereby incorporated by reference into the present application.

TECHNICAL FIELD

The art disclosed herein relates to a working machine.

BACKGROUND ART

Japanese Patent Application Publication No. H10-94561 describes a working machine including: a ground-contact part configured to contact the ground; a driver configured to drive the ground-contact part; a clutch mechanism configured to be switched between a transmission state in which a driving force from the driver is transmitted to the ground-contact part and a non-transmission state in which the driving force is not transmitted to the ground-contact part; a clutch operation part configured to switch a state of the clutch mechanism; and a braking mechanism configured to be switched between a braking state in which the braking mechanism is braking the ground-contact part and a non-braking state in which the braking mechanism is not braking the ground-contact part. This working machine is configured to switch the state of the clutch mechanism from the transmission state to the non-transmission state in the case where the braking mechanism is in the non-braking state.

SUMMARY

For example, the working machine may need to stop on a slope. In such a situation, the working machine can stop on the slope even when the state of the braking mechanism is the non-braking state so long as the state of the clutch mechanism is the transmission state, because the driver is stopped. However, when the state of the braking mechanism is the non-braking state and the state of the clutch mechanism is switched from the transmission state to the non-transmission state, the working machine could unintentionally move on the slope even though the driver is stopped.

The disclosure herein discloses art to maintain a state in which a working machine is stopped even when a state of a clutch mechanism is switched from a transmission state to a non-transmission state.

A working machine disclosed in the disclosure may comprise: a first ground-contact part configured to contact ground; a driver configured to drive the first ground-contact part; a clutch mechanism configured to be switched between a transmission state in which a driving force from the driver is transmitted to the first ground-contact part and a non-transmission state in which the driving force is not transmitted to the first ground-contact part; a clutch operation part configured to switch a state of the clutch mechanism; a braking mechanism configured to be switched between a braking state in which the braking mechanism is braking the first ground-contact part and a non-braking state in which the braking mechanism is not braking the first ground-contact part; and a braking operation part configured to switch a state of the braking mechanism. In a case where the state of the braking mechanism is the braking state, the clutch mechanism may be able to switch from the transmission state to the non-transmission state by operating the clutch operation part, and in a case where the state of the braking mechanism is the non-braking state, the clutch mechanism may not be able to switch from the transmission state to the non-transmission state even by operating the clutch operation part.

According to the above configuration, the state of the clutch mechanism can be switched from the transmission state to the non-transmission state only when the state of the braking mechanism is the braking state, and the state of the clutch mechanism cannot be switched from the transmission state to the non-transmission state if the state of the braking mechanism is the non-braking state. Due to this, upon when the state of the clutch mechanism is switched from the transmission state to the non-transmission state, brake is applied on the driver by the braking mechanism. As such, even when the state of the clutch mechanism is switched from the transmission state to the non-transmission state, a state in which the working machine is stopped can be maintained.

Figure 18:
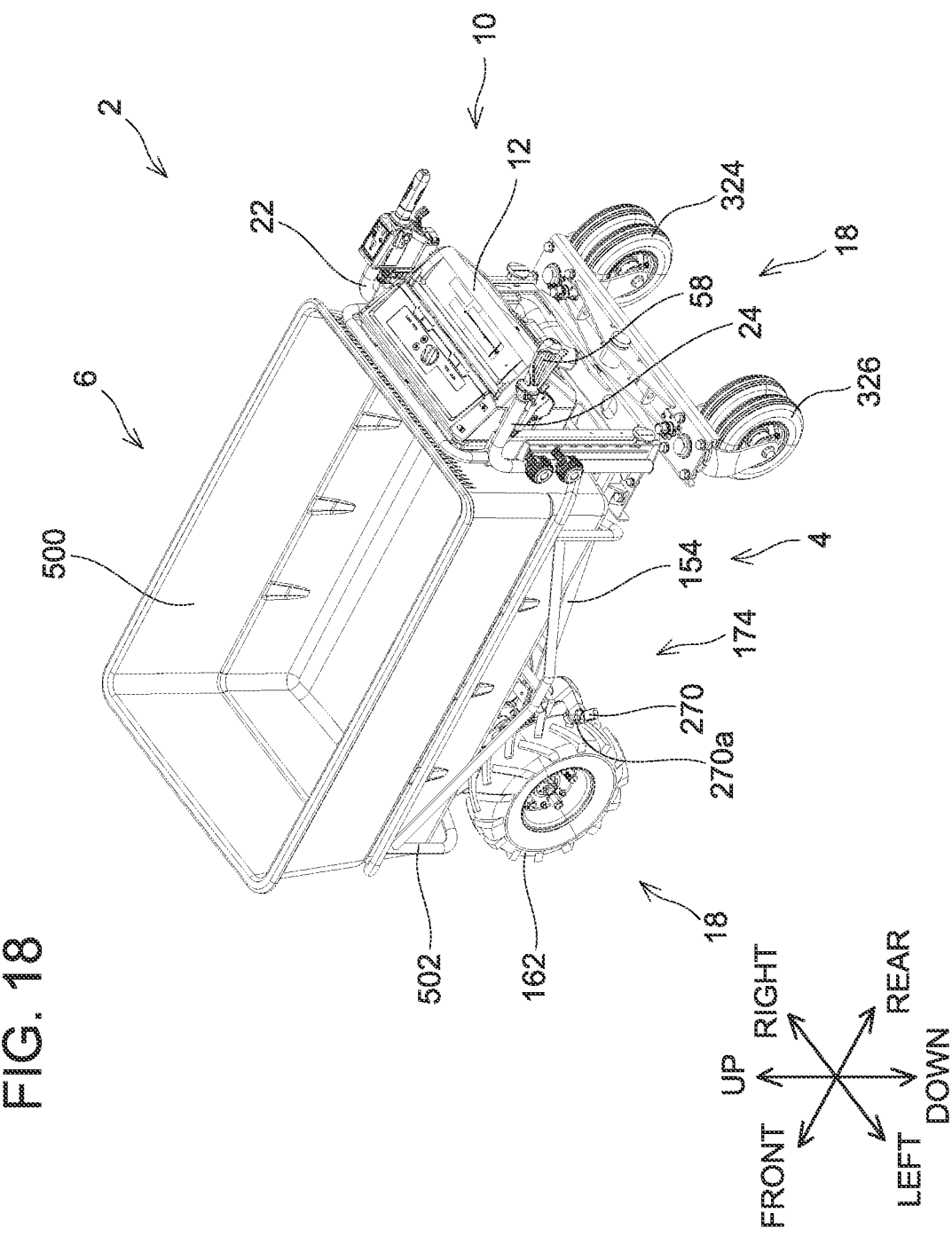

FIG. 18 is a perspective view viewing the cart 2 in the embodiment from the rear left upper side with the brake lever 58 pulled up and the clutch operation lever 270 pulled out.

Figure 19:
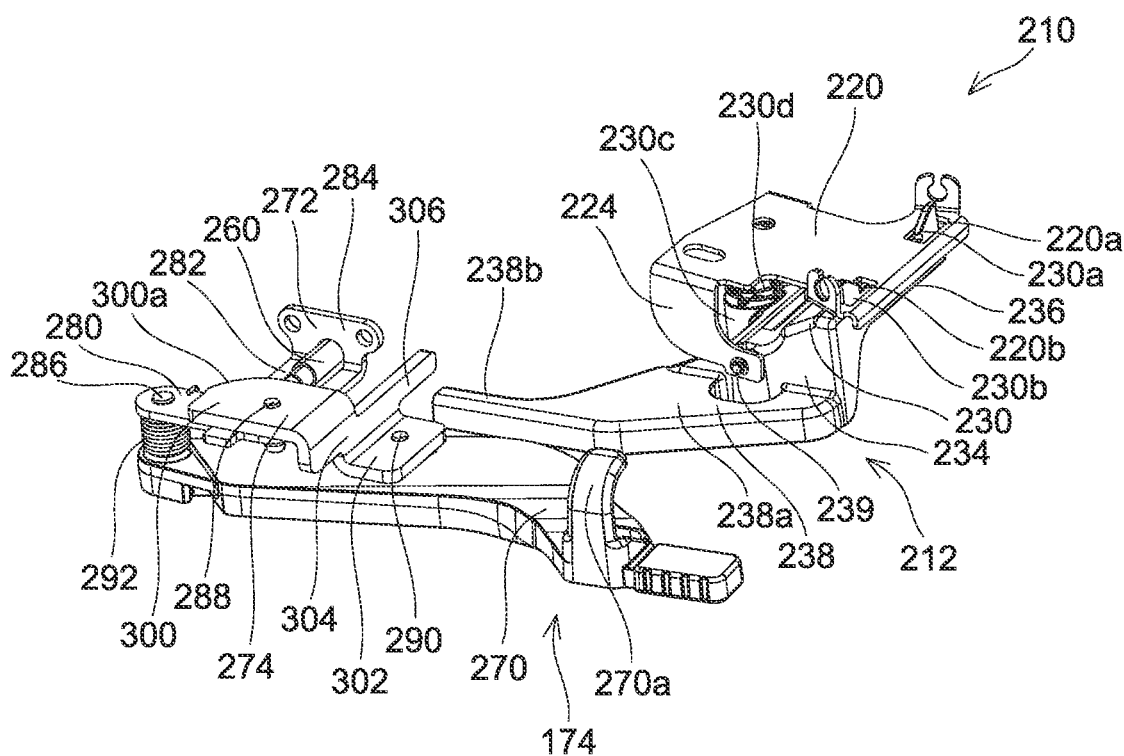
Figure 19:
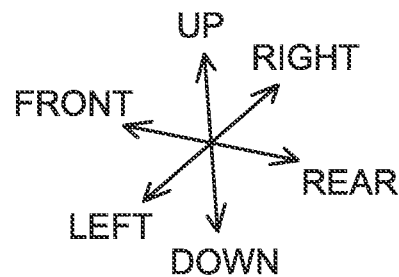

FIG. 19 is a perspective view viewing the support plate 210 and the rotary plate 212 in the state in which the brake lever 58 pulled up, and the clutch operating mechanism 174 in the embodiment as seen from the rear left upper side.

Figure 20:
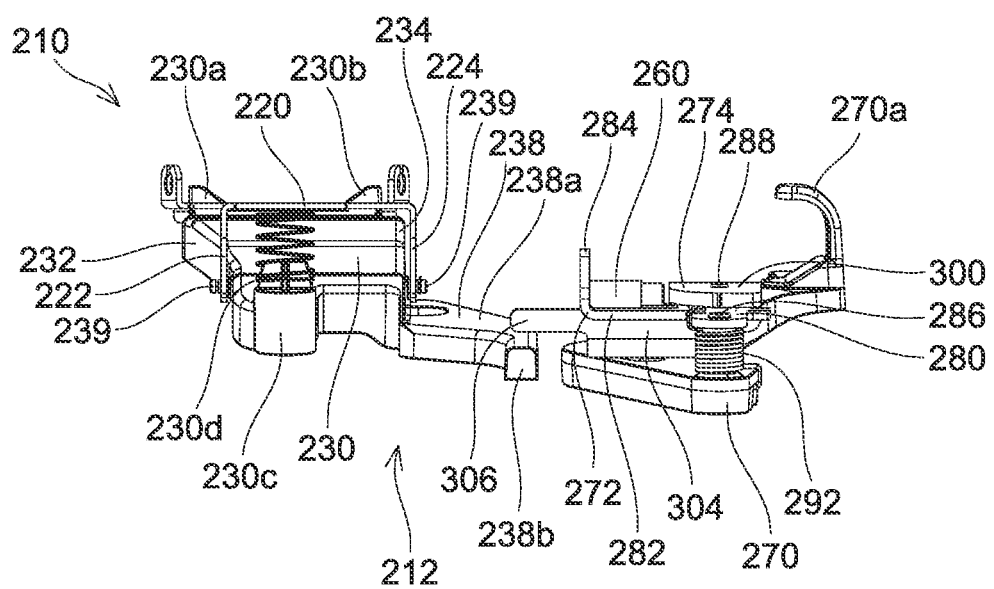

FIG. 20 is a front view viewing the support plate 210 and the rotary plate 212 in the state in which the brake lever 58 pulled up, and the clutch operating mechanism 174 from the front side in the embodiment.

Figure 21:
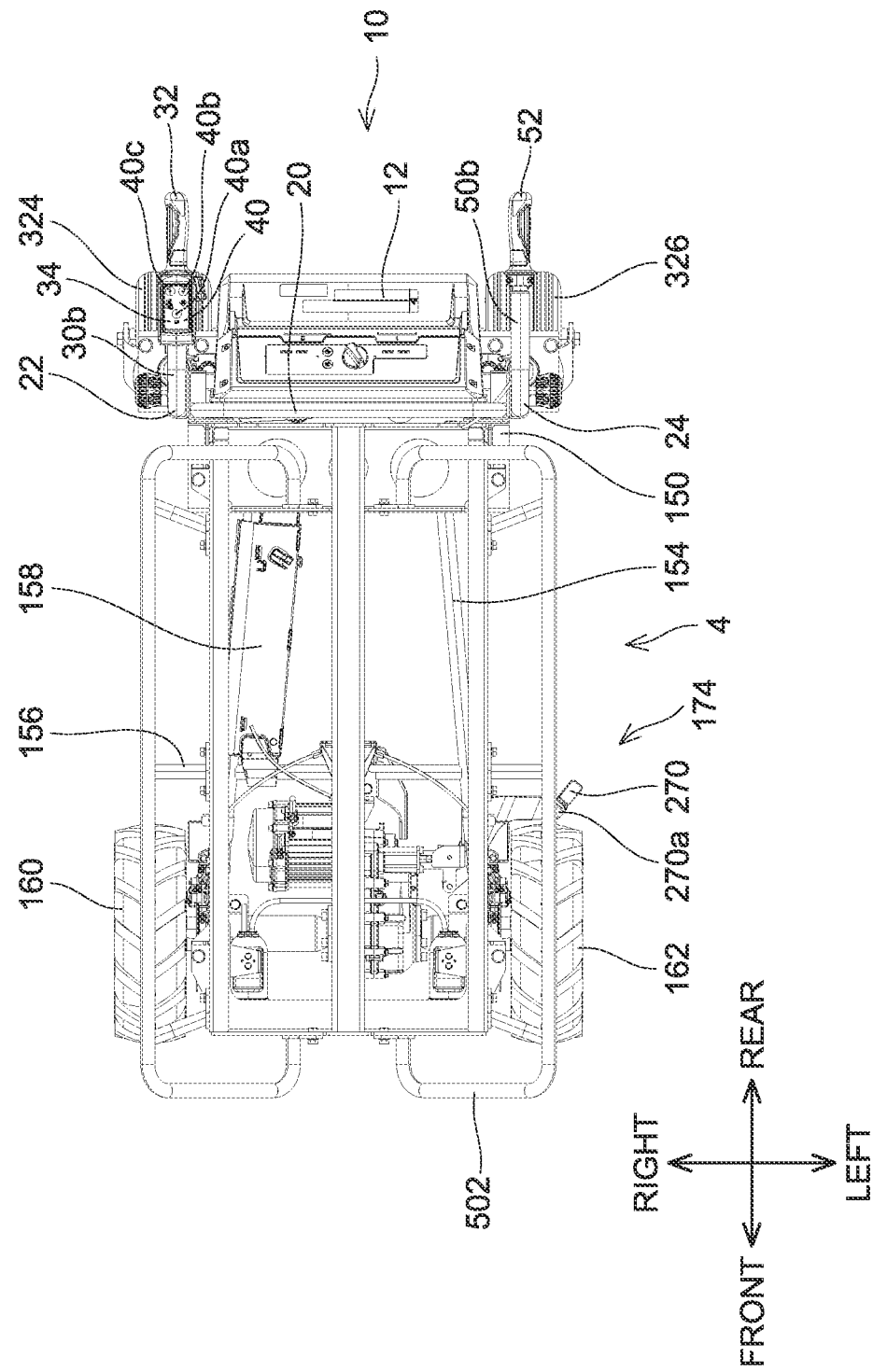

FIG. 21 is a top view viewing the carriage unit 4 and a wagon frame 502 from above with the brake lever 58 pulled up and the clutch operation lever 270 pulled out in the embodiment.

DETAILED DESCRIPTION

Representative, non-limiting examples of the disclosure herein will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a working machine may comprise: a first ground-contact part configured to contact ground; a driver configured to drive the first ground-contact part; a clutch mechanism configured to be switched between a transmission state in which a driving force from the driver is transmitted to the first ground-contact part and a non-transmission state in which the driving force is not transmitted to the first ground-contact part; a clutch operation part configured to switch a state of the clutch mechanism; a braking mechanism configured to be switched between a braking state in which the braking mechanism is braking the first ground-contact part and a non-braking state in which the braking mechanism is not braking the first ground-contact part; and a braking operation part configured to switch a state of the braking mechanism. In a case where the state of the braking mechanism is the braking state, the clutch mechanism may be able to switch from the transmission state to the non-transmission state by operating the clutch operation part, and in a case where the state of the braking mechanism is the non-braking state, the clutch mechanism may not be able to switch from the transmission state to the non-transmission state even by operating the clutch operation part.

In one or more embodiments, the clutch operation part may be configured to switch the state of the clutch mechanism from the transmission state to the non-transmission state in response to an operation by a user.

For example, when the clutch operation part is configured to use electric power to switch the clutch mechanism from the transmission state to the non-transmission state, the state of the clutch mechanism cannot be switched from the transmission state to the non-transmission state if an abnormality occurs in an electric power system related to the clutch operation part. According to the above configuration, even when an abnormality occurs in a part of the electric power system related to the clutch operation part, the user can manually operate the clutch operation part to switch the state of the clutch mechanism from the transmission state to the non-transmission state. As such, user convenience can be improved.

In one or more embodiments, the clutch operation part may comprise a clutch operation lever configured to be operated by the user. The state of the clutch mechanism is switched from the non-transmission state to the transmission state in response to an operation by the user on the clutch operation lever.

According to the above configuration, a configuration for operating the clutch mechanism can be simplified.

In one or more embodiments, the braking operation part may be configured to switch the state of the braking mechanism from the non-braking state to the braking state in response to an operation by a user.

For example, when the braking operation part is configured to use electric power to switch the braking mechanism from the non-braking state to the braking state, the state of the braking mechanism cannot be switched from the non-braking state to the braking state if an abnormality occurs in an electric power system related to the braking operation part, as a result of which the state of the clutch mechanism cannot be switched from the transmission state to the non-transmission state. According to the above configuration, even when an abnormality occurs in the electric power system related to the braking operation part, the user can switch the state of the braking mechanism from the non-braking state to the braking state, as a result of which the user can switch the state of the clutch mechanism from the transmission state to the non-transmission state. As such, user convenience can be improved.

In one or more embodiments, the braking operation part may comprise a braking operation lever configured to be operated by the user. The state of the braking mechanism may be switched from the non-braking state to the braking state in response to the operation by the user on the braking operation lever.

According to the above configuration, a configuration for operating the braking mechanism can be simplified.

In one or more embodiments, the working machine may further comprise a grip configured to be gripped by a user. In a case where the grip is gripped by the user and the state of the clutch mechanism is the non-transmission state, the clutch operation part may be disposed at a position where at least a part of the clutch operation part is visible to the user, and in a case where the grip is gripped by the user and the state of the clutch mechanism is the transmission state, the clutch operation part may be disposed at a position where the clutch operation part is not visible to the user.

According to the above configuration, the user can identify the state of the clutch mechanism in accordance with whether at least a part of the clutch operation part is visible. Thus, user convenience can be improved.

In one or more embodiments, the working machine may further comprise a second ground-contact part disposed frontward or rearward of the first ground-contact part and configured to contact the ground. In a case where the state of the clutch mechanism is the non-transmission state, at least the part of the clutch operation part may be disposed between the first ground-contact part and the second ground-contact part.

According to the above configuration, since at least a part of the clutch operation part is arranged between the first ground-contact part and the second ground-contact part, the user can easily see at least the part of the clutch operation part.

In one or more embodiments, the working machine may further comprise a support frame. In a case where the state of the clutch mechanism is the non-transmission state, when the working machine is viewed from the above, at least the part of the clutch operation part may be disposed outside of the support frame.

According to the above configuration, since at least a part of the clutch operation part is disposed outside the support frame, the user can easily see at least the part of the clutch operation part.

In one or more embodiments, the working machine may be a cart.

A cart is used for carrying heavy articles (such as a large amount of gravel). Due to this, it is preferable that a state in which the cart is stopped is maintained even when the clutch mechanism of the cart parked on a slope is switched from the transmission state to the non-transmission state. According to the above configuration, the state in which the cart is stopped can be maintained even when the state of the clutch mechanism is switched from the transmission state to the non-transmission state.

Embodiment

Figure 1:
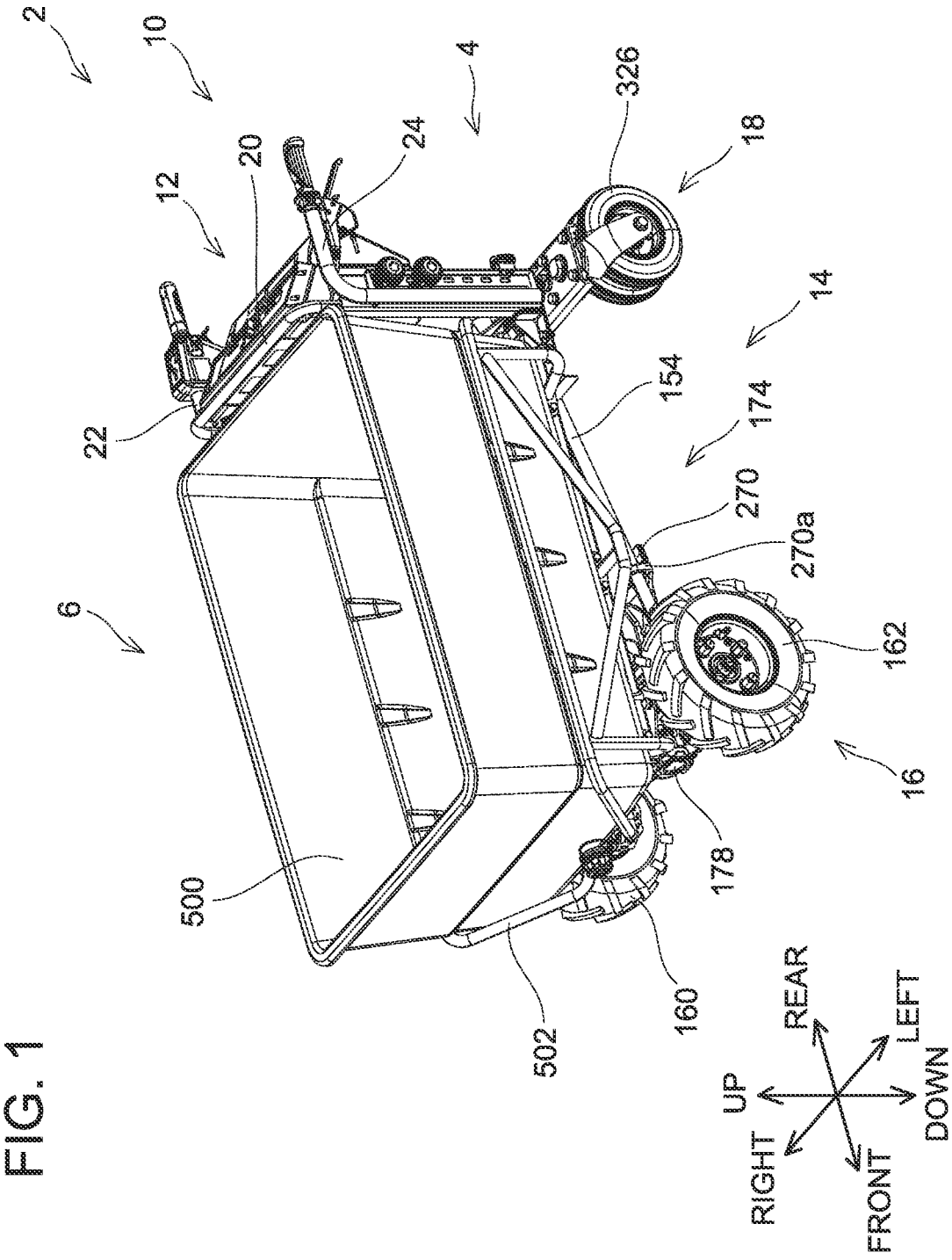
FIG. 1 is a perspective view viewing a cart 2 of an embodiment from the front left upper side.

A cart 2 will be described with reference to FIGS. 1 to 21. The cart 2 is a push cart. As shown in FIG. 1, the cart 2 includes a carriage unit 4 and a wagon unit 6. The wagon unit 6 includes a bucket 500 and a wagon frame 502 extending in a front-rear direction. In the wagon unit 6, the wagon frame 502 is fixed to the carriage unit 4 by screws. Further, in the wagon unit 6, the bucket 500 is not fixed to the wagon frame 502, and thus a user can place the bucket 500 on the wagon frame 502 or may lift the bucket 500 and remove the same from the wagon frame 502. The user can carry soil, fertilizer, and the like in the bucket 500.

(Configuration of Carriage Unit 4)

Figure 2:
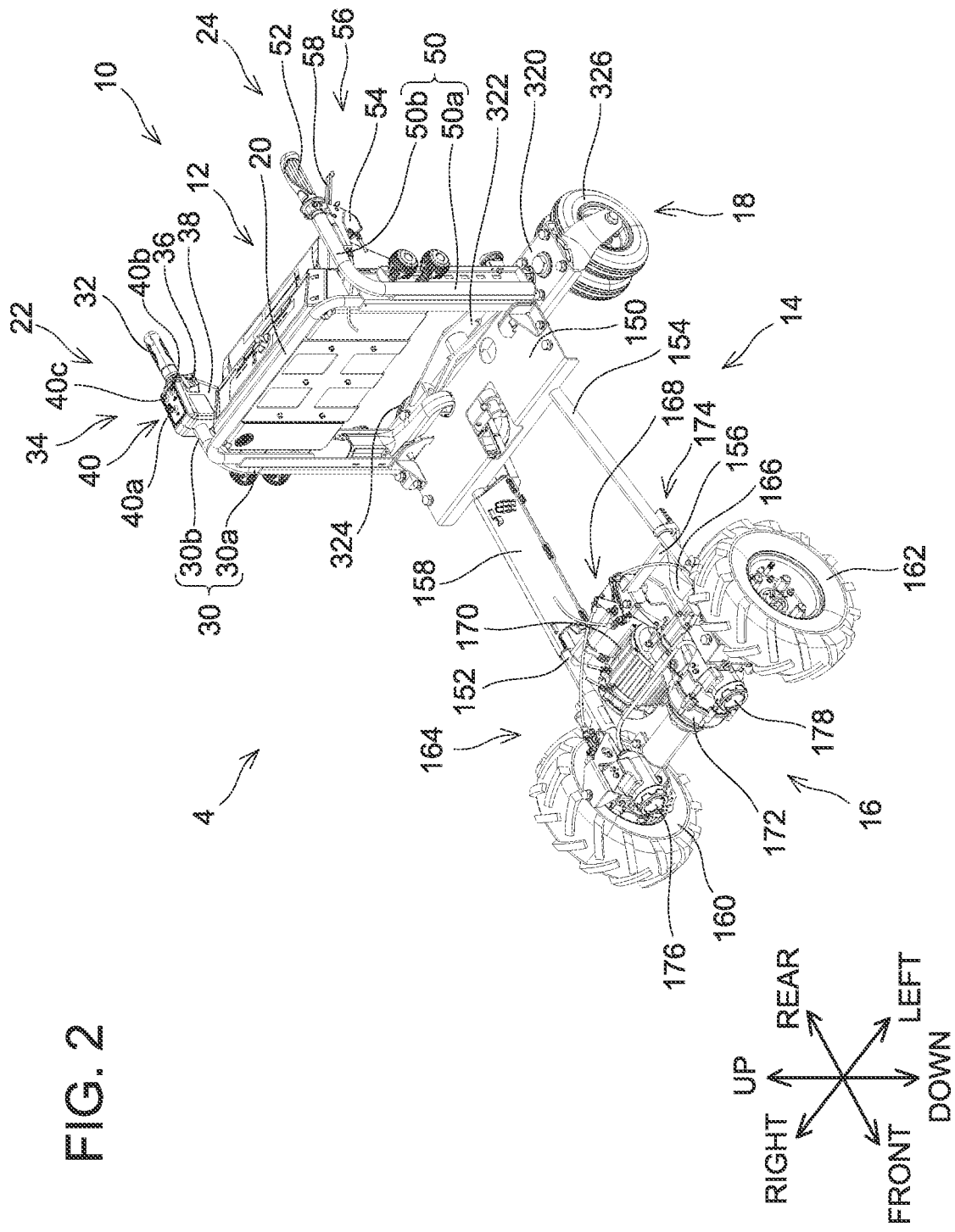
FIG. 2 is a perspective view viewing a carriage unit 4 of the embodiment from the front left upper side.

As shown in FIG. 2, the carriage unit 4 includes a handle unit 10, a battery box 12, a carriage frame 14, a front wheel unit 16, and a rear wheel unit 18.

(Configuration of Battery Box 12)

The battery box 12 is fixed to the handle unit 10. The battery box 12 has a battery pack 12a (see FIG. 3) and a controller 12b (see FIG. 3) housed therein. The controller 12b (see FIG. 3) is configured to control operations of a motor 170 (see FIG. 3) to be described later. The battery box 12 has a remaining charge display (not shown) configured to display remaining charge in the battery pack 12a (see FIG. 3).

(Configuration of Handle Unit 10)

The handle unit 10 includes a handle base 20, a right handle 22, and a left handle 24. The right handle 22 and the left handle 24 are fixed to the handle base 20 by screws. The handle base 20 is fixed by screws to a frame plate 150 of the carriage frame 14 to be described later. The handle base 20 has the battery box 12 fixed thereon with screws.

The right handle 22 includes a right pipe 30, a right grip 32, a switch box 34, and a driving lever 36. The right pipe 30 includes a right support part 30a extending in an up-down direction and a right handle part 30b bent rearward from the upper end of the right support part 30a. The right grip 32 and the switch box 34 are attached to the right handle part 30b of the right pipe 30. The right grip 32 is disposed behind the switch box 34.

Figure 3:
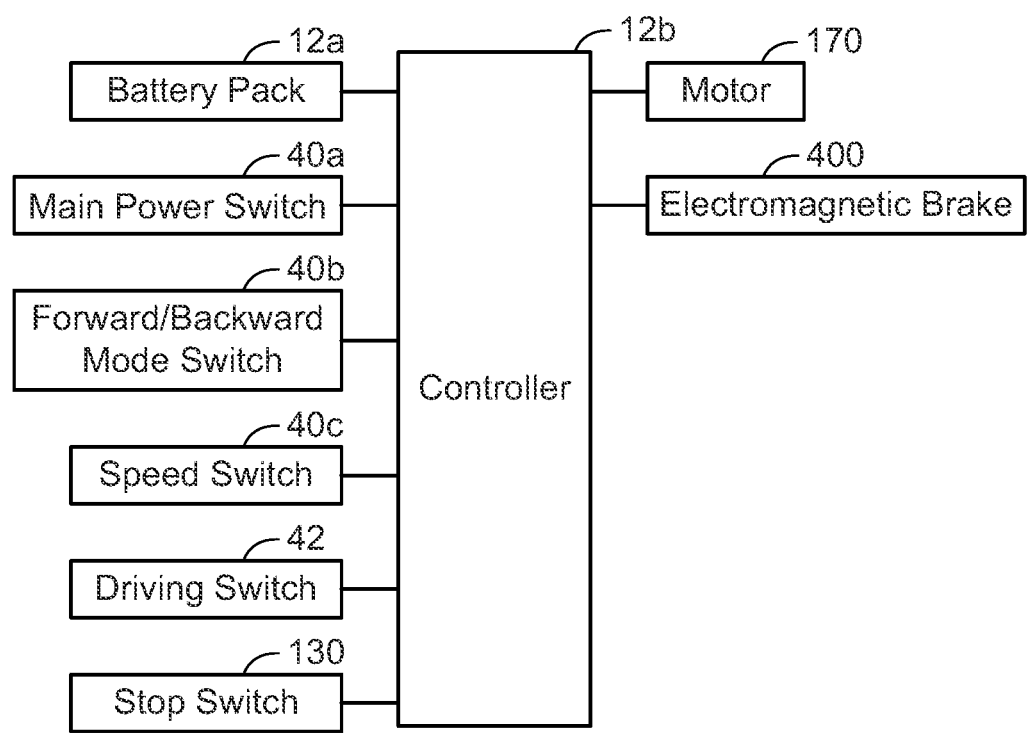
FIG. 3 shows a control configuration of the cart 2 of the embodiment.

The switch box 34 includes a right casing 38 and an operation panel 40. The operation panel 40 is disposed on an upper surface of the right casing 38. The operation panel 40 includes a main power switch 40a, a forward/backward mode switch 40b, and a speed switch 40c. The driving lever 36 is attached to a rear portion of the right casing 38. A drive switch 42 (see FIG. 3) configured to detect that the driving lever 36 is pulled up is housed in the switch box 34. As shown in FIG. 3, the main power switch 40a, the forward/backward mode switch 40b, the speed switch 40c, and the drive switch 42 are connected to the controller 12b in the battery box 12 (see FIG. 2). The controller 12b drives the motor 170 to be described later when it receives a signal indicating that the driving lever 36 (see FIG. 2) has been pulled up.

Figure 4:
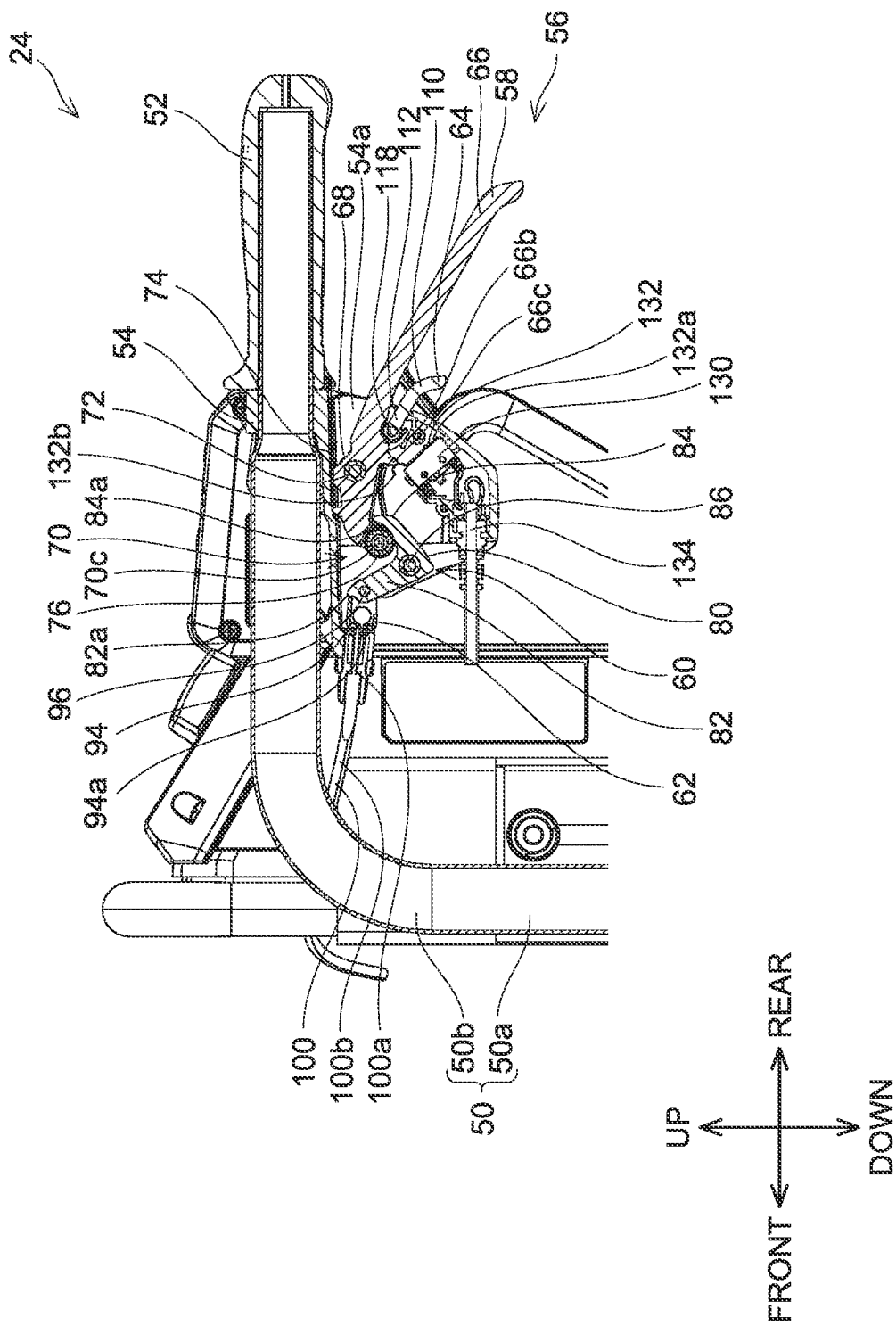
FIG. 4 is a cross-sectional view viewing a left handle 24 of the embodiment from the left side.

As shown in FIG. 2, the left handle 24 includes a left pipe 50, a left grip 52, a left casing 54, and a brake operating mechanism 56. The left pipe 50 includes a left support part 50a extending in the up-down direction and a left handle part 50b bent rearward from the upper end of the left support part 50a. As shown in FIG. 4, the left grip 52 and the left casing 54 are attached to the left handle part 50b of the left pipe 50. The left grip 52 is disposed behind the left casing 54.

Figure 5:
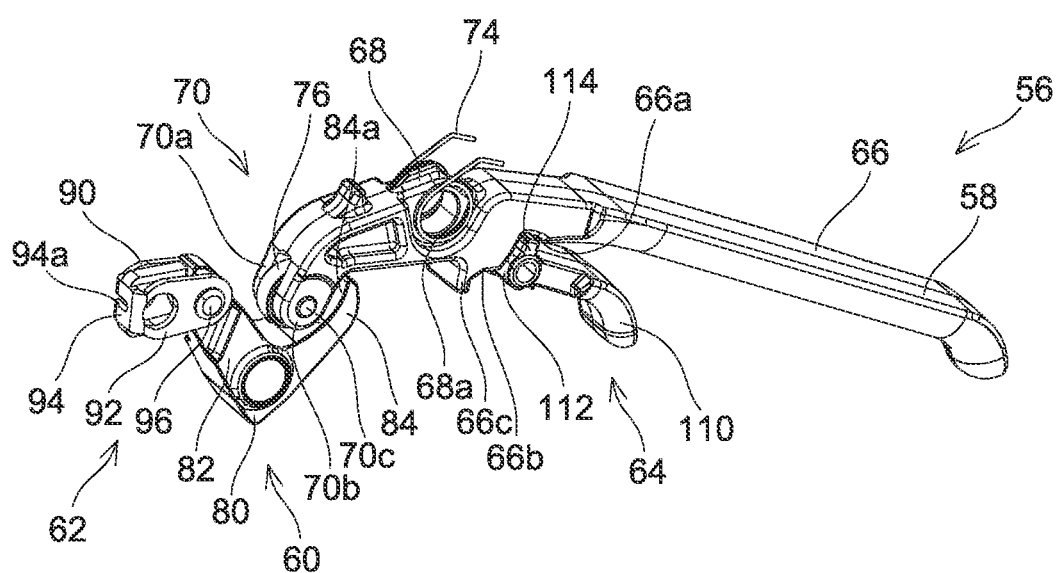
FIG. 5 is a perspective view viewing a brake operating mechanism 56 of the embodiment from the front left upper side.
Figure 5:
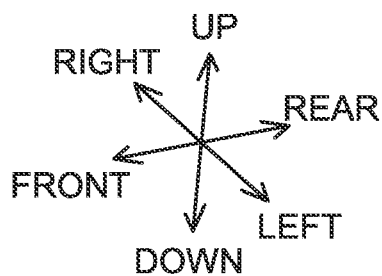
Figure 6:
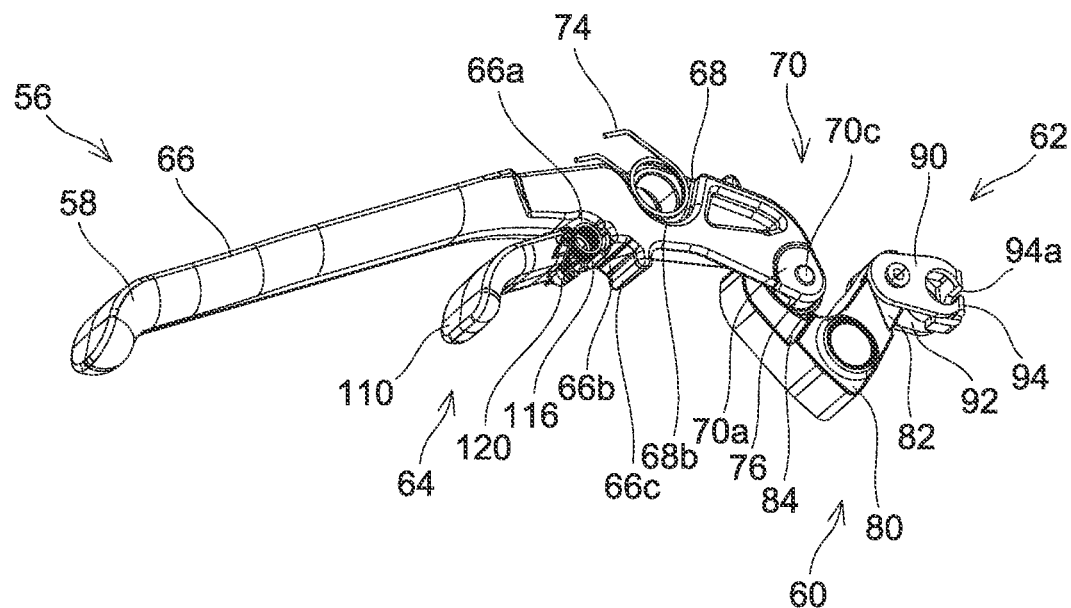
FIG. 6 is a perspective view viewing the brake operating mechanism 56 of the embodiment from the rear right lower side.
Figure 6:
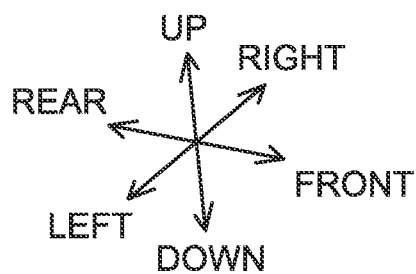

The brake operating mechanism 56 includes a brake lever 58, a first link member 60, a cable holder 62, and a fixing lever 64. The brake lever 58 includes an operation part 66, a support part 68, and a bearing holder 70. The operation part 66, the support part 68, and the bearing holder 70 are configured integrally. The support part 68 and the bearing holder 70 are housed in the left casing 54. The operation part 66 protrudes outside from inside the left casing 54 through an opening 54a defined in a rear surface of the left casing 54. The support part 68 is supported rotatably about a rotation shaft 72 extending in a left-right direction with respect to the left casing 54. As shown in FIG. 5, a recess 66a that is recessed upwardly is defined in a lower surface of a front portion of the operation part 66. A first protrusion 66b protruding downward and a second protrusion 66c protruding downward are arranged on the front side of the recess 66a. The lower end of the second protrusion 66c is positioned lower than the lower end of the first protrusion 66b. A left spring seat 68a is arranged on the left side of the support part 68. As shown in FIG. 6, a right spring seat 68b is arranged on the right side of the support part 68. A torsion spring 74 is arranged in the left spring seat 68a and the right spring seat 68b. The brake lever 58 is biased with respect to the left casing 54 by a biasing force of the torsion spring 74 such that a rear portion of the brake lever 58 is pressed downward. The bearing holder 70 is connected to a front portion of the support part 68. The bearing holder 70 includes a right wall 70a, a left wall 70b (see FIG. 5), and a shaft 70c. The shaft 70c extends in the left-right direction, and penetrates the right wall 70a and the left wall 70b. The brake lever 58 further includes a bearing 76. The bearing 76 is attached to the shaft 70c between the right wall 70a and the left wall 70b.

As shown in FIG. 4, the first link member 60 includes a support part 80, a first extension part 82 extending forward and upward from the support part 80, and a second extension part 84 extending rearward and upward from the support part 80. The support part 80 is rotatably supported about a rotation shaft 86 extending in the left-right direction with respect to the left casing 54. The bearing 76 contacts an upper surface 84a of the second extension part 84. A through hole 82a penetrating the first extension part 82 in the left-right direction is defined at the end of the first extension part 82 on the opposite side from the support part 80.

As shown in FIG. 5, the cable holder 62 includes a right wall 90, a left wall 92, a front wall 94, and a shaft 96. The right wall 90, the left wall 92, and the front wall 94 are configured integrally. The shaft 96 extends in the left-right direction, and connects the right wall 90 and the left wall 92 by penetrating through the through hole 82a of the first link member 60 (see FIG. 4). The first link member 60 and the cable holder 62 are rotatably coupled by the shaft 96. A cutout 94a extending leftward from the right end of the front wall 94 is defined in the front wall 94. As shown in FIG. 4, a brake cable 100 is connected to the cable holder 62. The brake cable 100 includes an inner cable 100a and an outer cable 100b covering a circumference of the inner cable 100a. The inner cable 100a penetrates through the cutout 94a, and the end of the inner cable 100a is held by the cable holder 62. The end of the outer cable 100b is held by the left casing 54.

Figure 7:
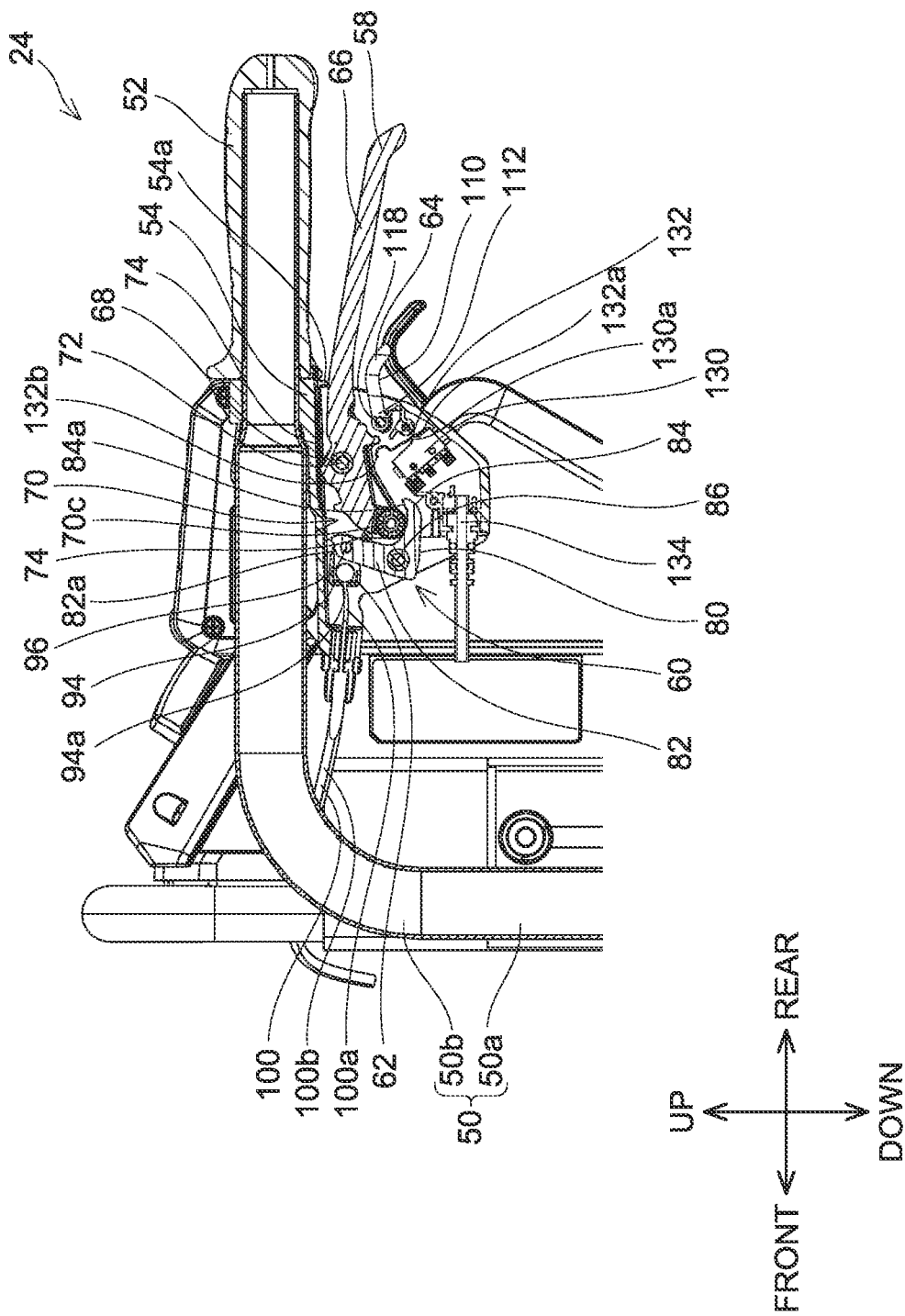
FIG. 7 is a cross-sectional view viewing the left handle 24 of the embodiment from the left side in the state in which where a brake lever 58 is pulled up.

As shown in FIG. 7, when the user pulls up the operation part 66 of the brake lever 58, the bearing holder 70 of the brake lever 58 moves downward. By the bearing holder 70 moving downward, the second extension part 84 of the first link member 60 moves downward, and also the first extension part 82 of the first link member 60 moves rearward. By the first extension part 82 of the first link member 60 moving rearward, the cable holder 62 moves rearward. By the cable holder 62 moving rearward, the inner cable 100a of the brake cable 100 is pulled out relative to the outer cable 100b (that is, moves rearward).

As shown in FIG. 4, when the user releases his/her hand from the operation part 66 of the brake lever 58, the operation part 66 of the brake lever 58 is pressed down by the biasing force of the torsion spring 74, and the bearing holder 70 of the brake lever 58 moves upward. Due to this bearing holder 70 moving upward, the second extension part 84 of the first link member 60 moves upward and also the first extension part 82 of the first link member 60 moves forward. Due to the first extension part 82 of the first link member 60 moving forward, the cable holder 62 moves forward. Due to the cable holder 62 moving forward, the inner cable 100a of the brake cable 100 is pushed in relative to the outer cable 100b (that is, moves forward).

As shown in FIG. 5, the fixing lever 64 includes an operation part 110, a support part 112, a projection 114, and a spring seat 116 (see FIG. 6). As shown in FIG. 4, the fixing lever 64 is arranged below the brake lever 58. The operation part 110 protrudes outside from inside the left casing 54 through the opening 54a defined in the rear surface of the left casing 54. The support part 112 is supported rotatably about a rotation shaft 118 extending in the left-right direction with respect to the left casing 54. As shown in FIG. 5, the projection 114 projects upward from the support part 112. An upper portion of the projection 114 contacts the recess 66a of the brake lever 58. As shown in FIG. 6, the spring seat 116 is arranged on the right side of the support part 112. A torsion spring 120 is arranged in the spring seat 116. The fixing lever 64 is biased with respect to the left casing 54 by a biasing force of the torsion spring 120 such that a rear portion of the fixing lever 64 is pressed downward.

As shown in FIG. 5, in the state in which the brake lever 58 is not operated by the user, the upper portion of the projection 114 of the fixing lever 64 contacts the recess 66a of the brake lever 58. In this state, when the user attempts to pull up the fixing lever 64, the fixing lever 64 cannot be pulled up due to a front surface of the projection 114 of the fixing lever 64 contacting a rear surface of the first protrusion 66b of the brake lever 58. Further, when the user releases the hand from the brake lever 58 after having pulled up the operation part 66 of the brake lever 58, the rear portion of the operation part 66 of the brake lever 58 is pressed down with respect to the left casing 54 by the biasing force of the torsion spring 74.

Figure 8:
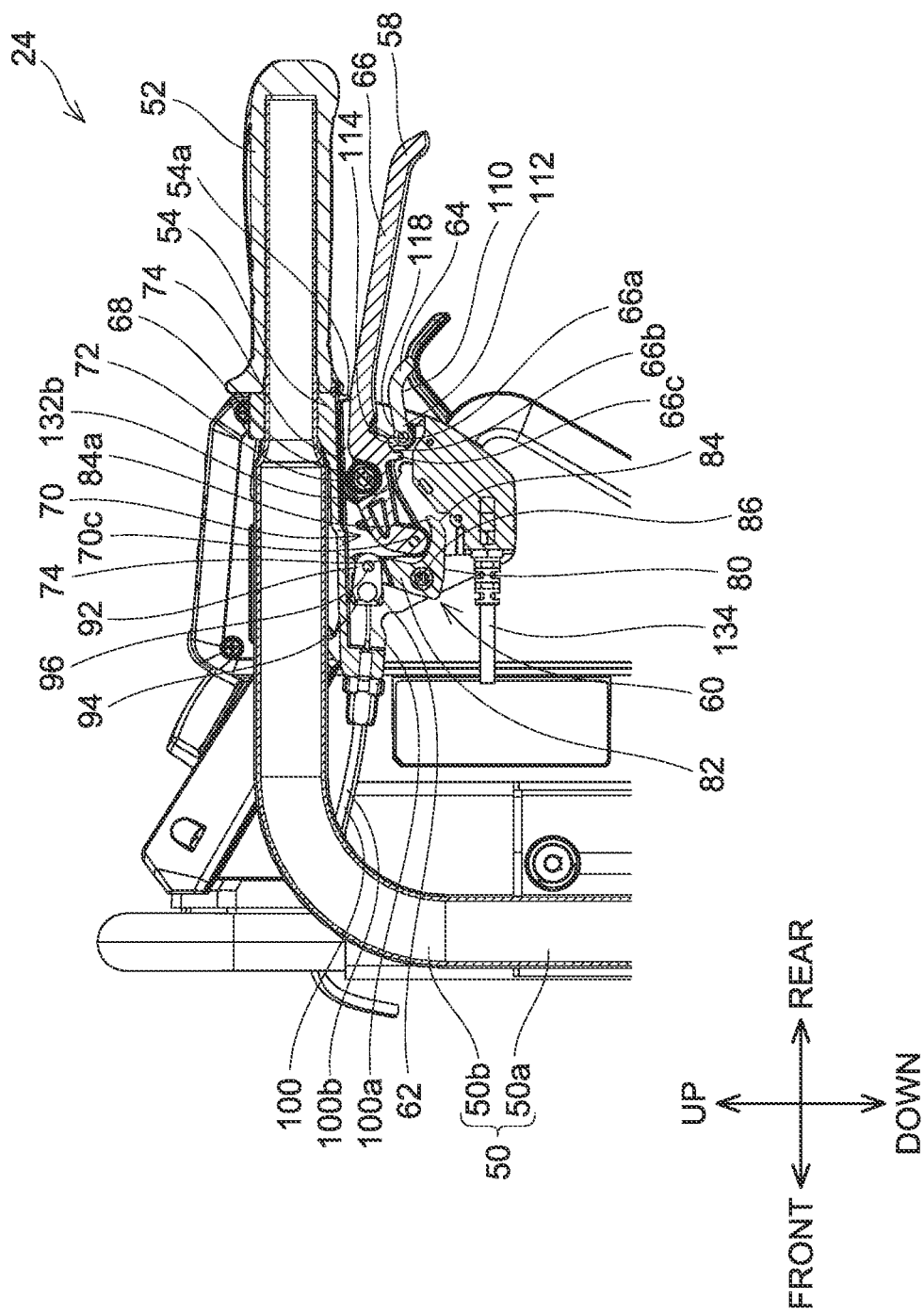
FIG. 8 is a cross-sectional view viewing the left handle 24 of the embodiment from the left side in the state in which a brake lever 58 is pulled up.

As shown in FIG. 8, when the user pulls up the operation part 66 of the brake lever 58 and further pulls up the operation part 110 of the fixing lever 64, the projection 114 of the fixing lever 64 moves forward beyond the recess 66a of the brake lever 58 and the projection 114 comes into contact with the lower surface of the first protrusion 66b of the operation part 66. In this state, the projection 114 of the fixing lever 64 is biased rearward and upward with respect to the left casing 54 by the biasing force of the torsion spring 120. On the other hand, a portion of the brake lever 58 that is in contact with the projection 114 of the fixing lever 64 is biased rearward and downward with respect to the left casing 54 by the biasing force of the torsion spring 74. However, due to the projection 114 of the fixing lever 64 interfering with the portion of the brake lever 58 that is in contact with the projection 114 of the fixing lever 64, the fixing lever 64 and the brake lever 58 are each prohibited to rotate with respect to the left casing 54. As such, the brake lever 58 is fixed in a pulled-up state by the fixing lever 64. In this state, when the user further pulls up the operation part 66 of the brake lever 58, the rear portion of the fixing lever 64 moves downward by the biasing force of the torsion spring 120, and the projection 114 moves rearward. Due to this, fixation of the brake lever 58 by the fixing lever 64 is thereby released. Further, when the user releases the hand from the operation part 66 of the brake lever 58, the rear portion of the operation part 66 of the brake lever 58 is pressed downward with respect to the left casing 54 by the biasing force of the torsion spring 74.

As shown in FIG. 4, the left casing 54 further has a stop switch 130 and a second link member 132 housed therein. One end 132a of the second link member 132 is connected to the stop switch 130 and another end 132b of the second link member 132 is arranged near the second protrusion 66c of the brake lever 58. The other end 132b of the second link member 132 is biased in a direction separating away from the stop switch 130 by a spring that is not shown. In the state in which the brake lever 58 is not operated, a switch part 130a (see FIG. 7) of the stop switch 130 is pressed by the second link member 132. As shown in FIG. 7, when the user pulls up the brake lever 58, the other end 132b of the second link member 132 moves in the direction separating away from the switch part 130a of the stop switch 130, as a result of which the second link member 132 separates away from the switch part 130a of the stop switch 130. Due to this, the brake lever 58 is detected as having been pulled up. As shown in FIG. 3, the stop switch 130 is connected to the controller 12b in the battery box 12 (see FIG. 2) by a signal cable 134 (see FIG. 4). The controller 12b stops driving the motor 170 to be described later when it receives a signal indicating that the brake lever 58 has been pulled up.

(Configuration of Carriage Frame 14)

As shown in FIG. 2, the carriage frame 14 includes the frame plate 150, a right frame pipe 152, a left frame pipe 154, and a center frame pipe 156. The frame plate 150 has the rear wheel unit 18 attached thereto. The right frame pipe 152 and the left frame pipe 154 are welded to the frame plate 150 at their rear ends, and extend forward. A space between the right frame pipe 152 and the left frame pipe 154 expands toward the front side from the rear side. The front wheel unit 16 is attached to the front ends of the right frame pipe 152 and the left frame pipe 154. The center frame pipe 156 is disposed near the front wheel unit 16 with its right end welded to the right frame pipe 152 and its left end welded to the left frame pipe 154. A cable cover 158 that protects power-feed cables (not shown) connecting the battery box 12 to a right front lamp 176 and a left front lamp 178 to be described later and a power cable (not shown) connecting the battery box 12 to the motor 170 to be described later is attached to the right frame pipe 152.

(Configuration of Rear Wheel Unit 18)

The rear wheel unit 18 includes a base plate 320, a hinge 322, a right rear wheel 324, and a left rear wheel 326. The right rear wheel 324 and the left rear wheel 326 are driven wheels. The right rear wheel 324 is connected to the right end of the base plate 320 and the left rear wheel 326 is connected to the left end thereof. The hinge 322 is welded to an upper surface of the base plate 320.

(Configuration of Front Wheel Unit 16)

Figure 9:
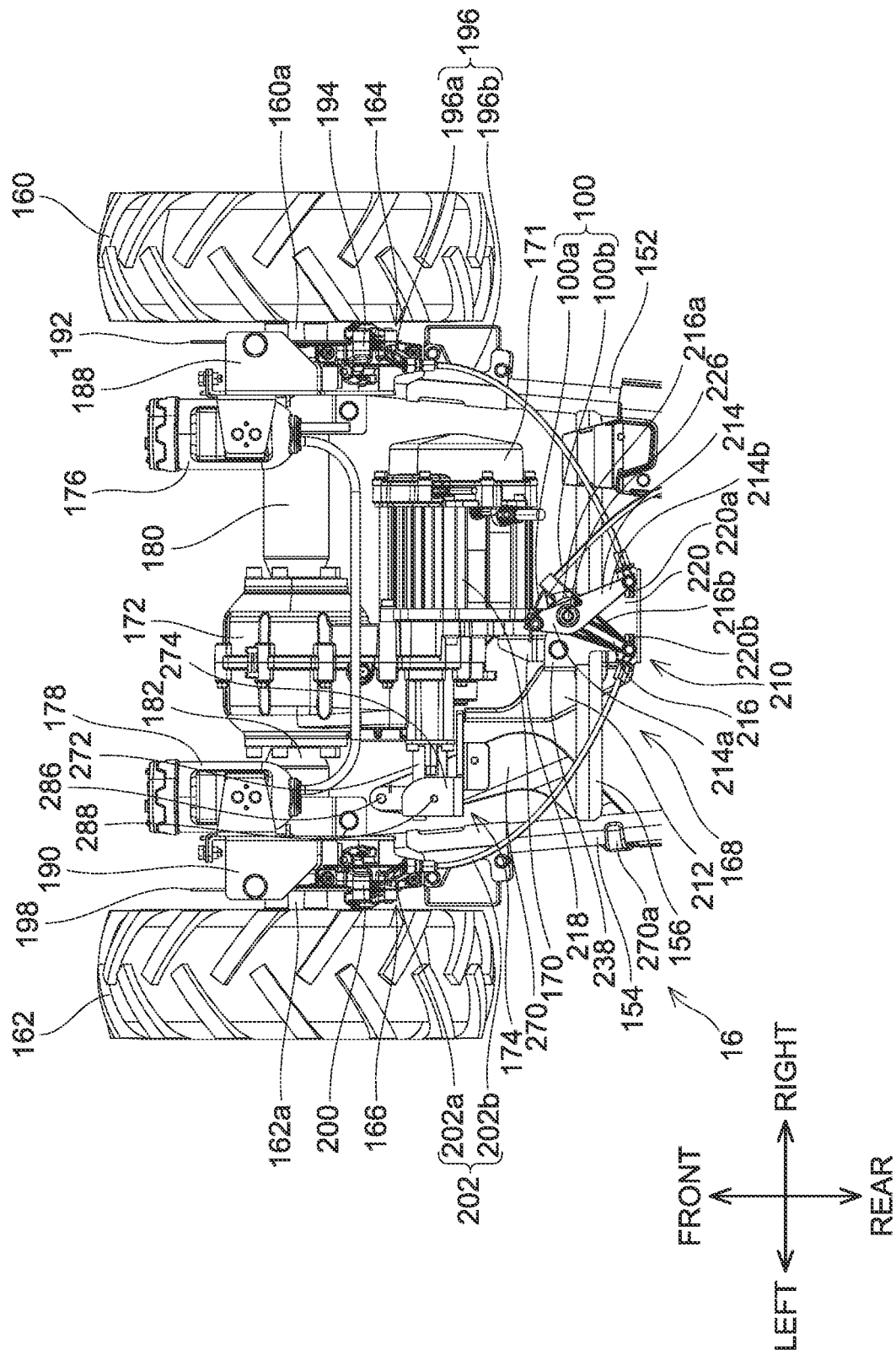
FIG. 9 is a top view viewing a front wheel unit 16 of the embodiment from above.
Figure 10:
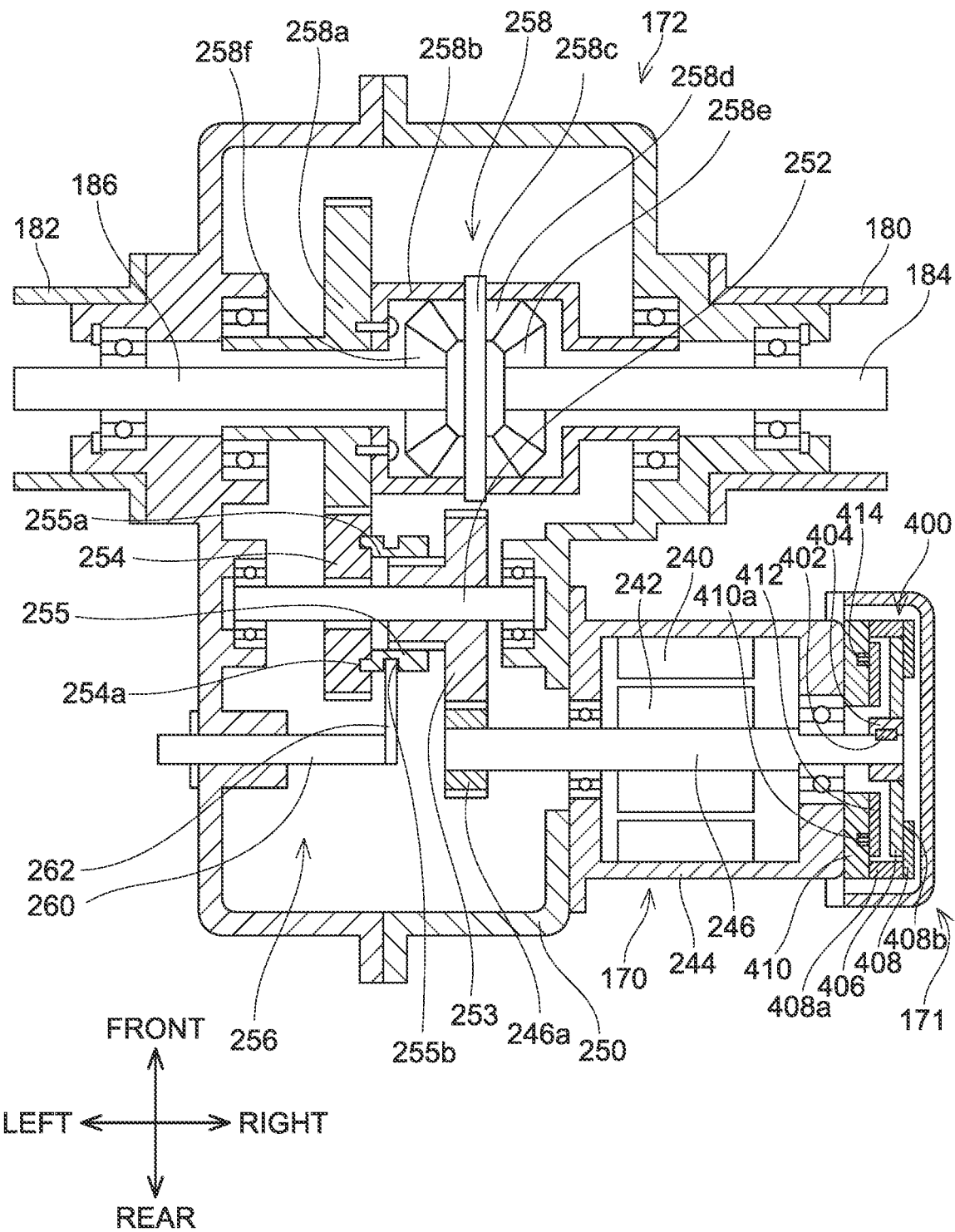
FIG. 10 is a horizontal cross-sectional view viewing a motor 170, an electromagnetic brake casing 171, and a gearbox 172 of the embodiment.

As shown in FIG. 9, the front wheel unit 16 includes a right front wheel 160, a left front wheel 162, a right front wheel brake 164, a left front wheel brake 166, a brake equalizer 168, the motor 170, an electromagnetic brake casing 171, a gearbox 172, a clutch operating mechanism 174, the right front lamp 176, and the left front lamp 178. A right axle casing 180 and a left axle casing 182 are fixed to the gearbox 172 by screws. The right front wheel 160 is connected to the gearbox 172 via a right driving shaft 184 (see FIGS. 10 and 11) extending within the right axle casing 180. The left front wheel 162 is connected to the gearbox 172 via a left driving shaft 186 (see FIGS. 10 and 11) extending within the left axle casing 182. The right axle casing 180 is supported by the right frame pipe 152 via a right bracket 188 welded to the right frame pipe 152. The left axle casing 182 is supported by the left frame pipe 154 via a left bracket 190 welded to the left frame pipe 154. As shown in FIG. 10, a right driving shaft 184 extends in the left-right direction inside the right axle casing 180 and is supported rotatably by the right axle casing 180. The left driving shaft 186 extends in the left-right direction inside the left axle casing 182 and is supported rotatably by the left axle casing 182.

As shown in FIG. 9, the right front wheel brake 164 includes a disk rotor 192 and a brake caliper 194. The disk rotor 192 is disposed on the left side of the right front wheel 160 and is fixed to the right front wheel 160 via a hub 160a. The brake caliper 194 is disposed corresponding to the disk rotor 192. The brake caliper 194 is supported by the right bracket 188. A right brake cable 196 is connected to the brake caliper 194. The right brake cable 196 includes an inner cable 196a and an outer cable 196b covering a circumference of the inner cable 196a. When the inner cable 196a of the right brake cable 196 is pulled in relative to the outer cable 196b, the brake caliper 194 applies a frictional force on the disk rotor 192 by pressing the vicinity of an outer edge of the disk rotor 192 using a pair of brake pads (not shown), and thereby brakes the right front wheel 160. When the inner cable 196a of the right brake cable 196 is pulled out relative to the outer cable 196b, the pair of brake pads separates from the disk rotor 192 and brake on the right front wheel 160 is released. The right front wheel brake 164 may be a so-called disk brake as above, or may be another type of brake, such as a drum brake or a band brake.

The left front wheel brake 166 includes a disk rotor 198 and a brake caliper 200. The disk rotor 198 is disposed on the right side of the left front wheel 162 and is fixed to the left front wheel 162 via a hub 162a. The brake caliper 200 is disposed corresponding to the disk rotor 198. The brake caliper 200 is supported by the left bracket 190. A left brake cable 202 is connected to the brake caliper 200. The left brake cable 202 includes an inner cable 202a and an outer cable 202b covering a circumference of the inner cable 202a. When the inner cable 202a of the left brake cable 202 is pulled in relative to the outer cable 202b, the brake caliper 200 applies a frictional force on the disk rotor 198 by pressing the vicinity of an outer edge of the disk rotor 198 using a pair of brake pads (not shown), and thereby brakes the left front wheel 162. When the inner cable 202a of the left brake cable 202 is pulled out relative to the outer cable 202b, the pair of brake pads separates from the disk rotor 198 and brake on the left front wheel 162 is released. The left front wheel brake 166 may be a so-called disk brake as above, or may be another type of brake, such as a drum brake or a band brake.

(Brake Equalizer 168)

The brake equalizer 168 includes a support plate 210, a rotary plate 212, a first link member 214, and a second link member 216. The center frame pipe 156 penetrates between the support plate 210 and the rotary plate 212.

Figure 12:
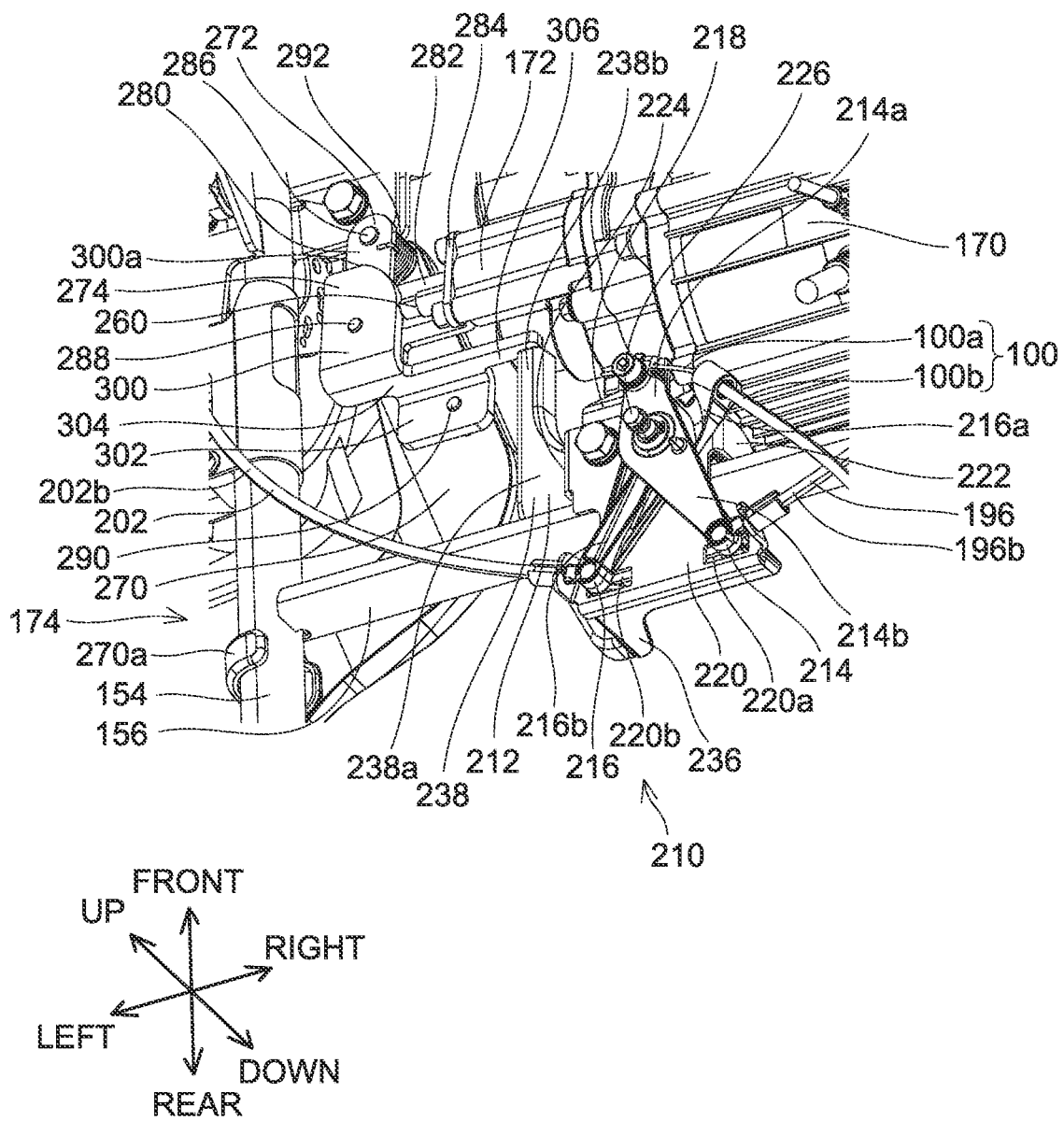
FIG. 12 is a perspective view viewing a brake equalizer 168 of the embodiment from the rear right upper side.

The support plate 210 is fixed to the motor 170 via a bracket 218. As shown in FIG. 12, the support plate 210 includes a base 220, a right extension part 222 extending downward from the front right end of the base 220, and a left extension part 224 extending downward from the front left end of the base 220. Openings 220a, 220b are defined on both left and right sides of a rear portion of the base 220. The first link member 214 and the second link member 216 are rotatably supported by the support plate 210 via a rotation shaft 226 extending in the up-down direction. The first link member 214 includes an input arm 214a extending forward from the rotation shaft 226 and an output arm 214b extending rightward and rearward from the rotation shaft 226. The inner cable 100a of the brake cable 100 extending from the brake operating mechanism 56 of the left handle 24 is coupled to the distal end of the input arm 214a. The inner cable 196a of the right brake cable 196 (see FIG. 13) is coupled to the distal end of the output arm 214b. The second link member 216 includes an input arm 216a extending rightward and frontward from the rotation shaft 226 and an output arm 216b extending leftward and rearward from the rotation shaft 226. The outer cable 100b of the brake cable 100 extending from the brake operating mechanism 56 of the left handle 24 is coupled to the distal end of the input arm 216a. The inner cable 202a of the left brake cable 202(see FIG. 13) is coupled to the distal end of the output arm 216b.

Both the outer cable 196b of the right brake cable 196 and the outer cable 202b of the left brake cable 202 are fixed to the support plate 210.

As shown in FIG. 4, when the brake lever 58 of the left handle 24 is not pulled up, the inner cable 196a of the right brake cable 196 is pressed in relative to the outer cable 196b by the first link member 214 and the inner cable 202a of the left brake cable 202 is pressed in relative to the outer cable 202b by the second link member 216 as shown in FIG. 12. In this state, brakes on the right front wheel 160 and the left front wheel 162 are released. Hereinbelow, a state in which the brakes on the right front wheel 160 and the left front wheel 162 are released may be termed a "non-braking state".

Figure 13:
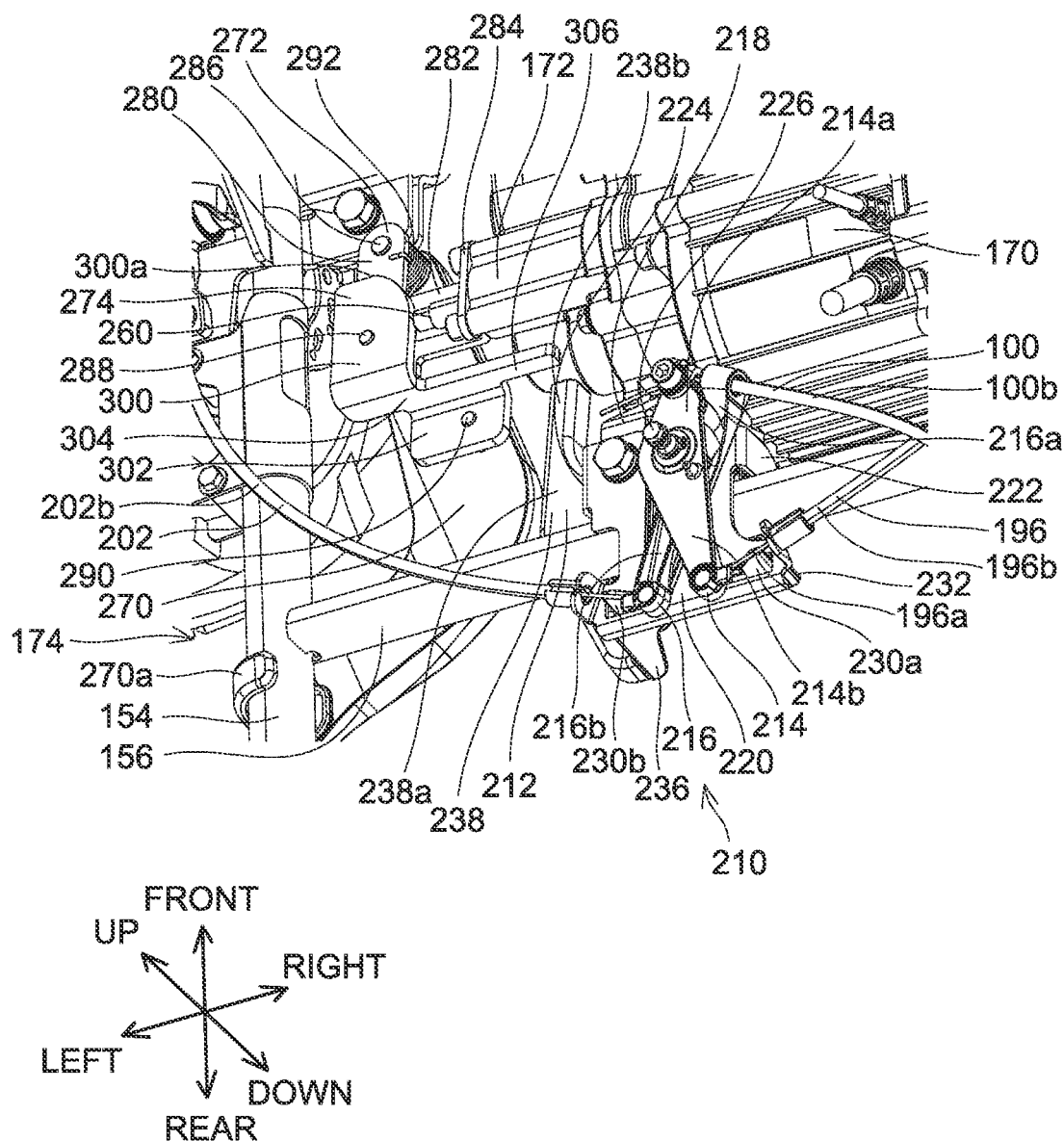
FIG. 13 is a perspective view viewing the brake equalizer 168 of the embodiment from the rear right upper side in the state in which the brake lever 58 is pulled up.

As shown in FIG. 7, when the brake lever 58 of the left handle 24 is pulled up by the user, the inner cable 100a of the brake cable 100 is pulled in relative to the outer cable 100b. Due to this, as shown in FIG. 13, the first link member 214 rotates in a direction by which the input arm 214a moves rightward and the output arm 214b moves leftward, thus the inner cable 196a of the right brake cable 196 is pulled out relative to the outer cable 196b. Concurrently with this, the second link member 216 rotates in a direction by which the input arm 216a moves leftward and the output arm 216b moves rightward, thus the inner cable 202a of the left brake cable 202 is pulled out relative to the outer cable 202b. Due to this, brake is applied to each of the right front wheel 160 and the left front wheel 162. Hereinbelow, a state in which the brakes are applied to both the right front wheel 160 and the left front wheel 162 may be termed a "braking state".

Figure 14:
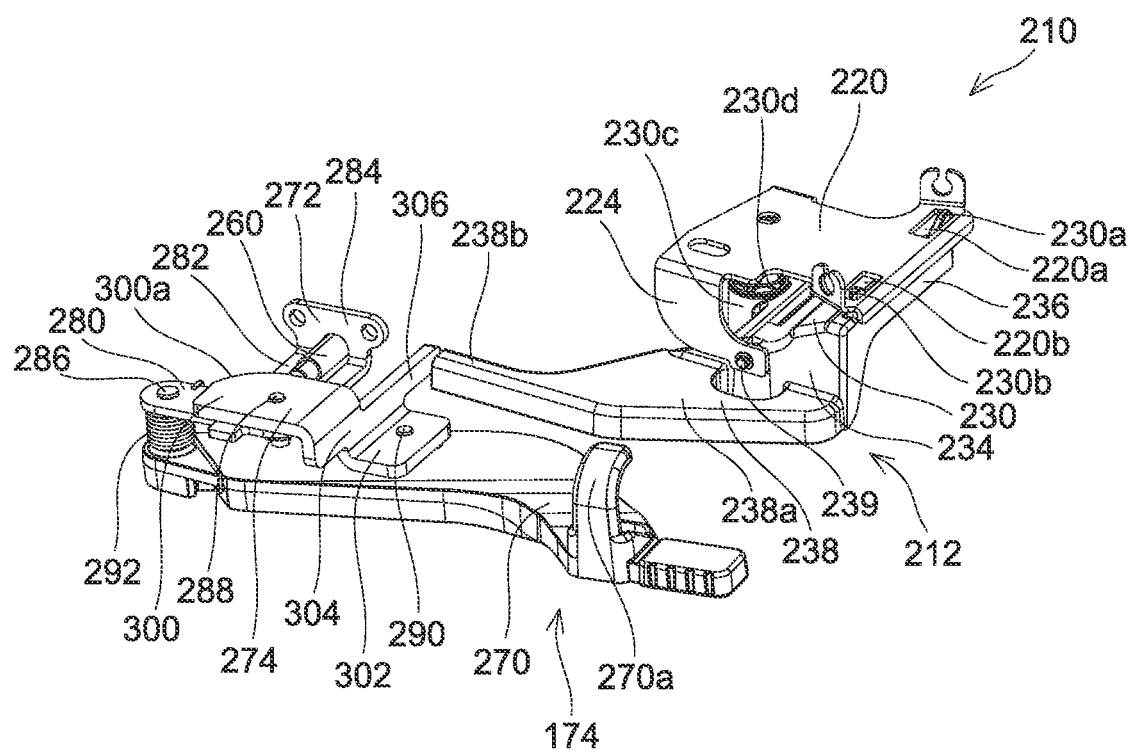
FIG. 14 is a perspective view viewing a support plate 210, a rotary plate 212, and a clutch operating mechanism 174 of the embodiment from the rear left upper side.
Figure 14:
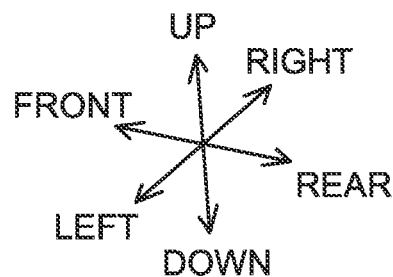
Figure 15:
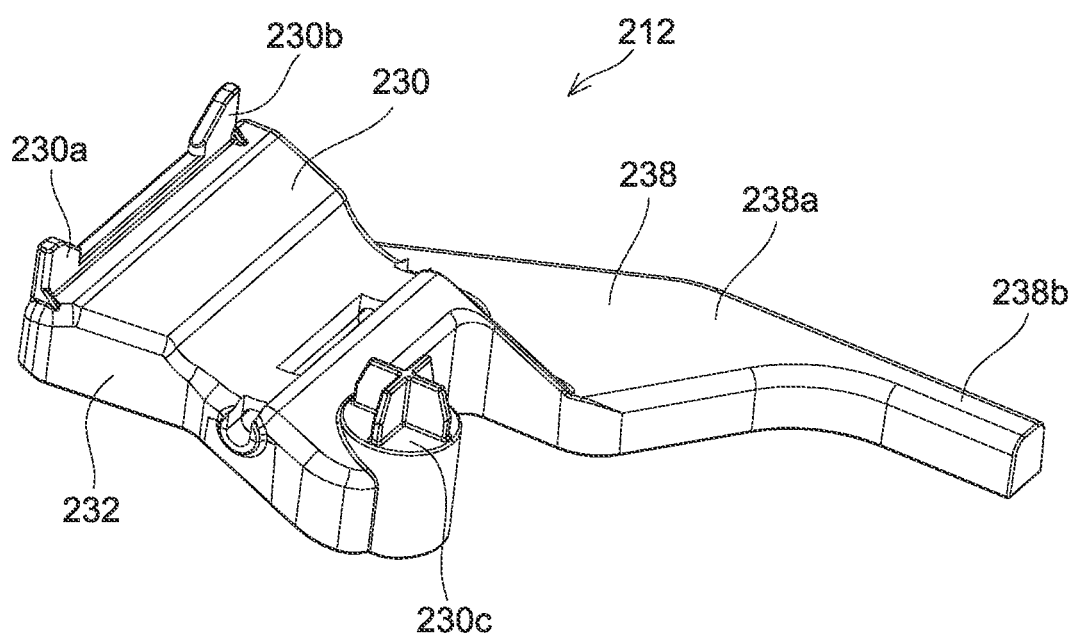
FIG. 15 is a perspective view viewing the rotary plate 212 of the embodiment from the front right upper side.

As shown in FIG. 14, the rotary plate 212 includes an upper wall 230, a right wall 232 (see FIG. 15), a left wall 234, a rear wall 236, and an extension part 238. The upper wall 230, the right wall 232, the left wall 234, the rear wall 236, and the extension part 238 are configured integrally. The rotary plate 212 is supported relative to the support plate 210 such that it can rotate about a rotation shaft 239 extending in the left-right direction. The upper wall 230 is inclined downward from its rear side toward its front side. Protrusions 230a, 230b that protrude upward are arranged on both left and right sides of a rear portion of the upper wall 230. The protrusions 230a, 230b are arranged at positions corresponding to the openings 220a, 220b of the support plate 210. A spring seat 230c is arranged at a front portion of the upper wall 230. A spring 230d is placed in the spring seat 230c. The front portion of the upper wall 230 of the rotary plate 212 is biased downward relative to the support plate 210 by the spring 230d. The extension part 238 includes a first extension part 238a extending leftward from the lower end of the left wall 234 and a second extension part 238b extending frontward from the left end of the first extension part 238a. When the brake lever 58 of the left handle 24 is not pulled up as shown in FIG. 4, the distal end of the output arm 214b of the first link member 214 and the distal end of the output arm 216b of the second link member 216 are disposed on upper surfaces of the protrusions 230a, 230b as shown in FIG. 12. Further, the protrusions 230a, 230b are pressed down, that is, into the openings 220a, 220b, by the distal end of the output arm 214b and the output arm 216b of the second link member 216.

(Clutch Operating Mechanism 174)

Figure 16:
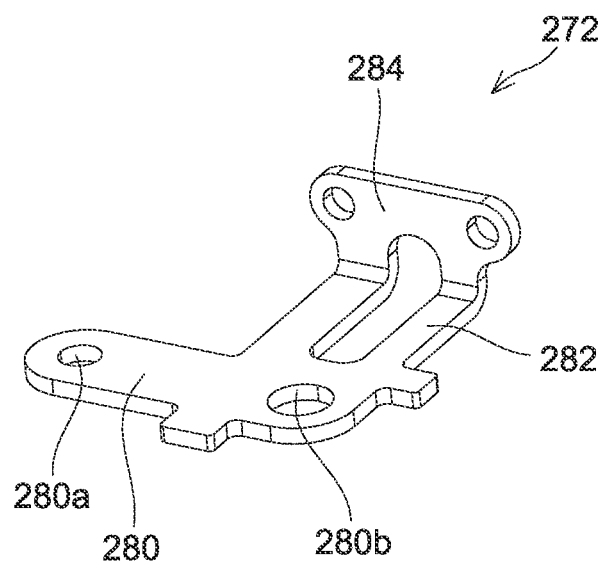
FIG. 16 is a perspective view viewing a support bracket 272 of the embodiment from the rear left upper side.

The clutch operating mechanism 174 includes a clutch operation lever 270, a support bracket 272, and a rod operation part 274. As shown in FIG. 16, the support bracket 272 includes a base 280 extending in the front-rear direction, a right extension part 282 extending rightward from a rear portion of the base 280, and an attachment part 284 extending upward from the right end of the right extension part 282. The support bracket 272 is fixed to the gearbox 172 (see FIG. 12) by screws via the attachment part 284. A through hole 280a through which a rotation shaft 286 (see FIG. 12) is to penetrate in the up-down direction is defined in a front portion of the base 280. A through hole 280b through which a rotation shaft 288 (see FIG. 12) is to penetrate in the up-down direction is defined in the rear portion of the base 280.

As shown in FIG. 12, the clutch operation lever 270 extends rightward and frontward from the left frame pipe 154, and further bends to extend leftward and frontward. The clutch operation lever 270 is supported by the support bracket 272 such that it is rotatable about the rotation shaft 286. Further, the clutch operation lever 270 is coupled to the rod operation part 274 such that it is rotatable about a rotation shaft 290. The clutch operation lever 270 includes an attachment part 270a for attaching the clutch operating mechanism 174 to the left frame pipe 154. A torsion spring 292 is attached to the rotation shaft 286. The torsion spring 292 is disposed between the clutch operation lever 270 and the base 280 of the support bracket 272. Function of the torsion spring 292 will be described later.

As shown in FIG. 14, the rod operation part 274 includes a cam 300, a coupling part 302, a connecting part 304 connecting the cam 300 to the coupling part 302, and a protrusion 306 protruding rightward from the right end of the connecting part 304. The right end of the protrusion 306 is positioned on the right side of the right end of the coupling part 302. A position of the right end of the protrusion 306 and a position of the right end of the second extension part 238b of the rotary plate 212 are substantially the same. Further, a height of the protrusion 306 and a height of the second extension part 238b of the rotary plate 212 are substantially the same. The cam 300 is supported by the support bracket 272 such that it is rotatable about the rotation shaft 288. A cam surface 300a of the cam 300 has a shape by which it moves a clutch rod 260 (see FIG. 12) to be described later leftward in the state in which the clutch operation lever 270 is attached to the left frame pipe 154 (see FIG. 12) and moves the clutch rod 260 (see FIG. 12) to be described later rightward in the state in which the clutch operation lever 270 is pulled out from the left frame pipe 154 (see FIGS. 17 and 18). The coupling part 302 is coupled to the clutch operation lever 270 such that it is rotatable about the rotation shaft 290.

(Motor 170)

As shown in FIG. 10, the motor 170 includes a stator 240, a rotor 242, and a motor casing 244. The motor 170 may for example be a brushless DC motor. The stator 240 and the rotor 242 are housed in the motor casing 244. The stator 240 is fixed to the motor casing 244. The rotor 242 is fixed to the motor shaft 246. The motor shaft 246 extends in the left-right direction, and is supported rotatably on the motor casing 244. The left end of the motor shaft 246 is connected to the gearbox 172. The right end of the motor shaft 246 is connected to the electromagnetic brake casing 171. The motor 170 is connected to the battery box 12 (see FIG. 2) via a power cable that is not shown. Electric power is supplied from the battery pack 12a (see FIG. 3) to the motor 170. An operation of the motor 170 is controlled by the controller 12b (see FIG. 3).

(Electromagnetic Brake Casing 171)

An electromagnetic brake 400 is housed in the electromagnetic brake casing 171. The electromagnetic brake 400 includes a key 402, a hub 404, a disk rotor 406, a plate 408, an electromagnet 410, an armature 412, and a spring 414.

The key 402 is fitted in a key groove defined at the right end of the motor shaft 246. The disk rotor 406 is fixed to the motor shaft 246 via the key 402 and the hub 404. The electromagnet 410 is arranged on the left side of the disk rotor 406. The electromagnet 410 includes a spring seat 410a. The spring 414 is arranged in the spring seat 410a of the electromagnet 410. The armature 412 is arranged between the electromagnet 410 and the disk rotor 406. The spring 414 biases the armature 412 rightward (toward the disk rotor 406). The plate 408 includes a first plate 408a extending rightward from the rear end of the electromagnet 410 and a second plate 408b extending toward the motor shaft 246 from the right end of the first plate 408a. A left surface of the second plate 408b contacts a right surface of the disk rotor 406. The electromagnetic brake 400 is connected to the battery box 12 (see FIG. 2) via a power cable that is not shown. Electric current is supplied from the battery pack 12a (see FIG. 3) to the electromagnetic brake 400. An operation of the electromagnetic brake 400 is controlled by the controller 12b (see FIG. 3).

Figure 11:
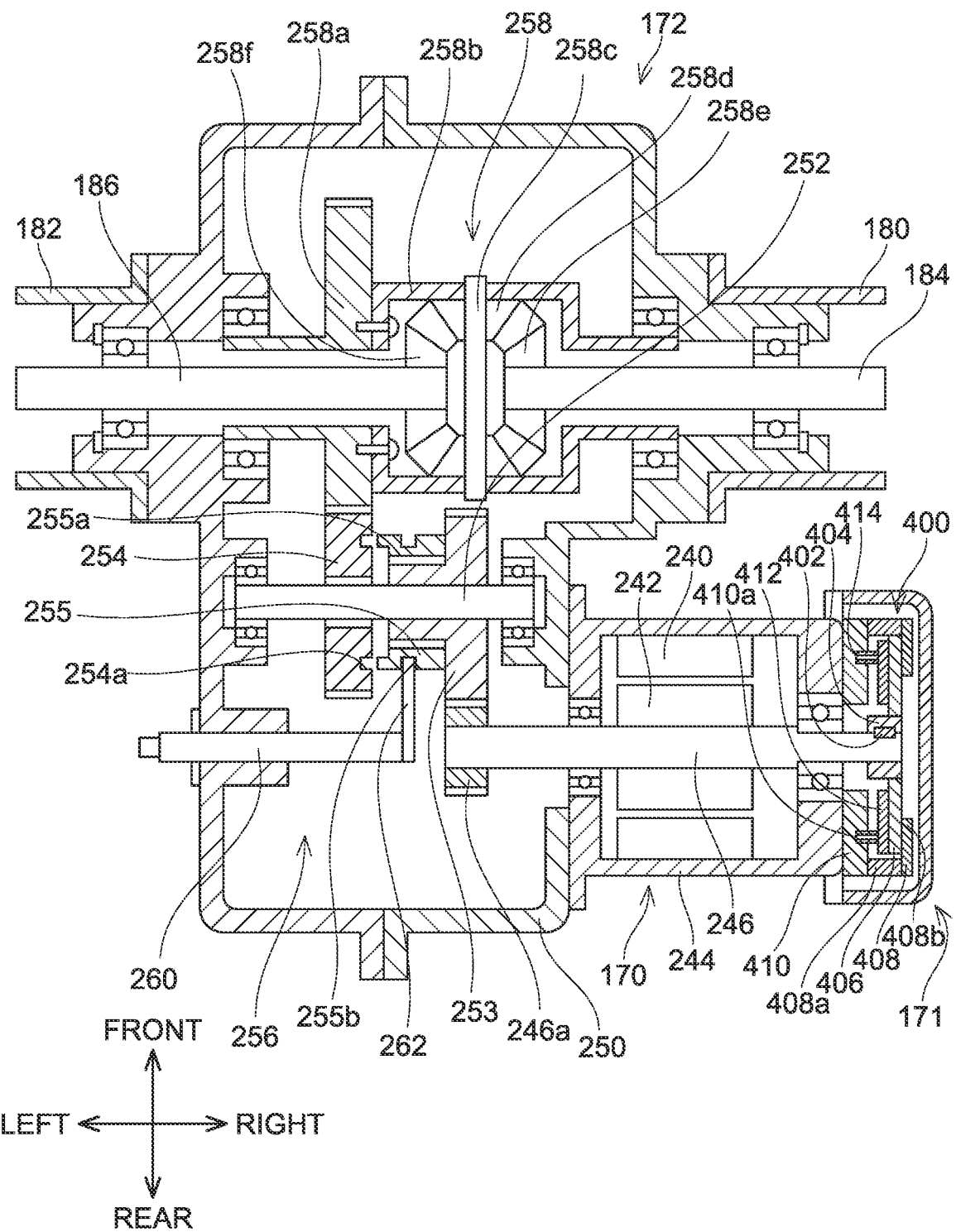
FIG. 11 is a horizontal cross-sectional view viewing the motor 170, the electromagnetic brake casing 171 with an armature 412 pressed thereon, and the gearbox 172 in the state in which a clutch rod 260 is pressed in in the embodiment.

When current is supplied to the electromagnet 410, the armature 412 is drawn toward the electromagnet 410 against a biasing force of the spring 414, and the brake of the motor shaft 246 is released. As shown in FIG. 11, when the current is not supplied to the electromagnetic brake 400, the armature 412 is biased rightward with respect to the electromagnet 410 by the spring 414. In this case, the motor shaft 246 is braked by applying a frictional force on the disk rotor 406 by the plate 408 and the armature 412 holding the vicinity of an outer edge of the disk rotor 406. In this embodiment, the controller 12b of FIG. 3 drives the motor 170 and supplies the current to the electromagnet 410 (see FIG. 10) when it receives a signal indicating that the drive switch 42 is turned on. Further, the controller 12b stops the motor 170 and stops the current supply to the electromagnet 410 (see FIG. 11) when it receives a signal indicating that the stop switch 130 has been turned off.

(Gearbox 172)

As shown in FIG. 11, the gearbox 172 includes a gear casing 250, an intermediate shaft 252, a clutch mechanism 256, and a differential mechanism 258. The intermediate shaft 252 extends in the left-right direction and is supported rotatably on the gear casing 250. The intermediate shaft 252 includes a first gear 253, a second gear 254, and a dog clutch 255. The first gear 253 is fixed to the intermediate shaft 252. The first gear 253 meshes with a spur gear 246a arranged on the motor shaft 246. The second gear 254 includes an engaging recess 254a that is recessed leftward. The second gear 254 is immobile in the left-right direction with respect to the intermediate shaft 252 and is supported rotatably. The dog clutch 255 is movable in the left-right direction with respect to the second gear 254 and is supported such that it cannot rotate. The dog clutch 255 includes an engaging protrusion 255a protruding leftward and configured to engage with the engaging recess 254a of the second gear 254 and an engaging groove 255b extending in a circumferential direction on its outer circumferential surface.

The clutch mechanism 256 includes a clutch rod 260 and a selector 262. The clutch rod 260 extends in the left-right direction and penetrates the gear casing 250 from inside to outside thereof. The clutch rod 260 is supported by the gear casing 250 such that it is slidable in the left-right direction. The left end of the clutch rod 260 is disposed facing the cam 300 of the clutch operating mechanism 174 (see FIG. 12). The selector 262 is fixed to the right end of the clutch rod 260. The selector 262 is engaged with the engaging groove 255b of the dog clutch 255.

The differential mechanism 258 includes a ring gear 258a, a pinion casing 258b, a pinion shaft 258c, a pinion gear 258d, a right driving gear 258e, and a left driving gear 258f. The ring gear 258a meshes with the second gear 254 of the intermediate shaft 252. The pinion casing 258b is fixed to the ring gear 258a by screws, and rotates integrally with the ring gear 258a. The ring gear 258a is supported rotatably on the gear casing 250, and the pinion casing 258b is rotatably supported on the gear casing 250. The pinion shaft 258c is rotatably supported on the pinion casing 258b. The pinion gear 258d is fixed to the pinion shaft 258c. The right driving gear 258e is fixed to the right driving shaft 184 and meshes with the pinion gear 258d. The left driving gear 258f is fixed to the left driving shaft 186 and meshes with the pinion gear 258d.

FIG. 10 is a state in which the clutch operation lever 270 (see FIG. 12) of the clutch operating mechanism 174 (see FIG. 12) is attached to the left frame pipe 154 (see FIG. 12). In this state, the engaging protrusion 255a of the dog clutch 255 engages with the engaging recess 254a of the second gear 254, and thus the second gear 254 rotates when the first gear 253 rotates. Due to this, motive power from the motor shaft 246 is transmitted to the ring gear 258a of the differential mechanism 258 via the intermediate shaft 252. In this case, the differential mechanism 258 rotates each of the right driving shaft 184 and the left driving shaft 186 in accordance with the motive power transmitted to the ring gear 258a.

FIG. 11 is a state in which the clutch operation lever 270 (see FIG. 18) of the clutch operating mechanism 174 (see FIG. 18) is pulled out from the left frame pipe 154 (see FIG. 18). In this state, the engaging protrusion 255a of the dog clutch 255 is not engaged with the engaging recess 254a of the second gear 254, and thus the second gear 254 does not rotate even when the first gear 253 rotates. Due to this, the motive power from the motor shaft 246 is not transmitted to the ring gear 258a of the differential mechanism 258.

Hereinbelow, the state in which the engaging protrusion 255a of the dog clutch 255 is engaged with the engaging recess 254a of the second gear 254 (see FIG. 10) may be termed a "transmission state", and the state in which the engaging protrusion 255a of the dog clutch 255 is not engaged with the engaging recess 254a of the second gear 254 (see FIG. 11) may be termed a "non-transmission state". As aforementioned, in the transmission state, the driving force from the motor 170 is transmitted to the right front wheel 160 and the left front wheel 162 through the right driving shaft 184 and the left driving shaft 186. On the other hand, in the non-transmission state, the driving force from the motor 170 is not transmitted to the right front wheel 160 or the left front wheel 162.

By operating the clutch operation lever 270 (see FIG. 12) of the clutch operating mechanism 174 (see FIG. 12), the user can switch the state of the clutch mechanism 256 (see FIG. 10) from the transmission state to the non-transmission state. However, as shown in FIG. 14, in the state where the height of the protrusion 306 of the rod operation part 274 and the height of the second extension part 238b of the rotary plate 212 are the same, the clutch operation lever 270 cannot be pulled out from the left frame pipe 154 even when the user attempts to pull out the clutch operation lever 270 (see FIG. 12) from the left frame pipe 154 (hereinbelow may be termed a "clutch releasing operation") due to the protrusion 306 of the rod operation part 274 coming into contact with the second extension part 238b of the rotary plate 212.

As shown in FIG. 7, when the user pulls up the brake lever 58 of the left handle 24, the inner cable 100a of the brake cable 100 is pulled in relative to the outer cable 100b, and as shown in FIG. 13, the first link member 214 rotates in the direction by which the input arm 214a of the first link member 214 moves rightward and the output arm 214b of the first link member 214 moves leftward, thus the distal end of the output arm 214b separates from the protrusion 230a of the rotary plate 212. Concurrently with this, the second link member 216 rotates in the direction by which the input arm 216a of the second link member 216 moves leftward and the output arm 216b of the second link member 216 moves rightward, thus the distal end of the output arm 216b separates away from the protrusion 230b of the rotary plate 212. In this case, as shown in FIG. 19, a front portion of the rotary plate 212 is pressed down with respect to the support plate 210 by a biasing force of the spring 230d of the rotary plate 212. Due to this, as shown in FIG. 20, a protrusion 306 of the rod operation part 274 comes to a position higher than the second extension part 238b of the rotary plate 212. Due to this, even when the clutch operation lever 270 is operated, the protrusion 306 of the rod operation part 274 no longer comes into contact with the second extension part 238b of the rotary plate 212. Due to this, the user is allowed to pull out the clutch operation lever 270 from the left frame pipe 154.

Figure 17:
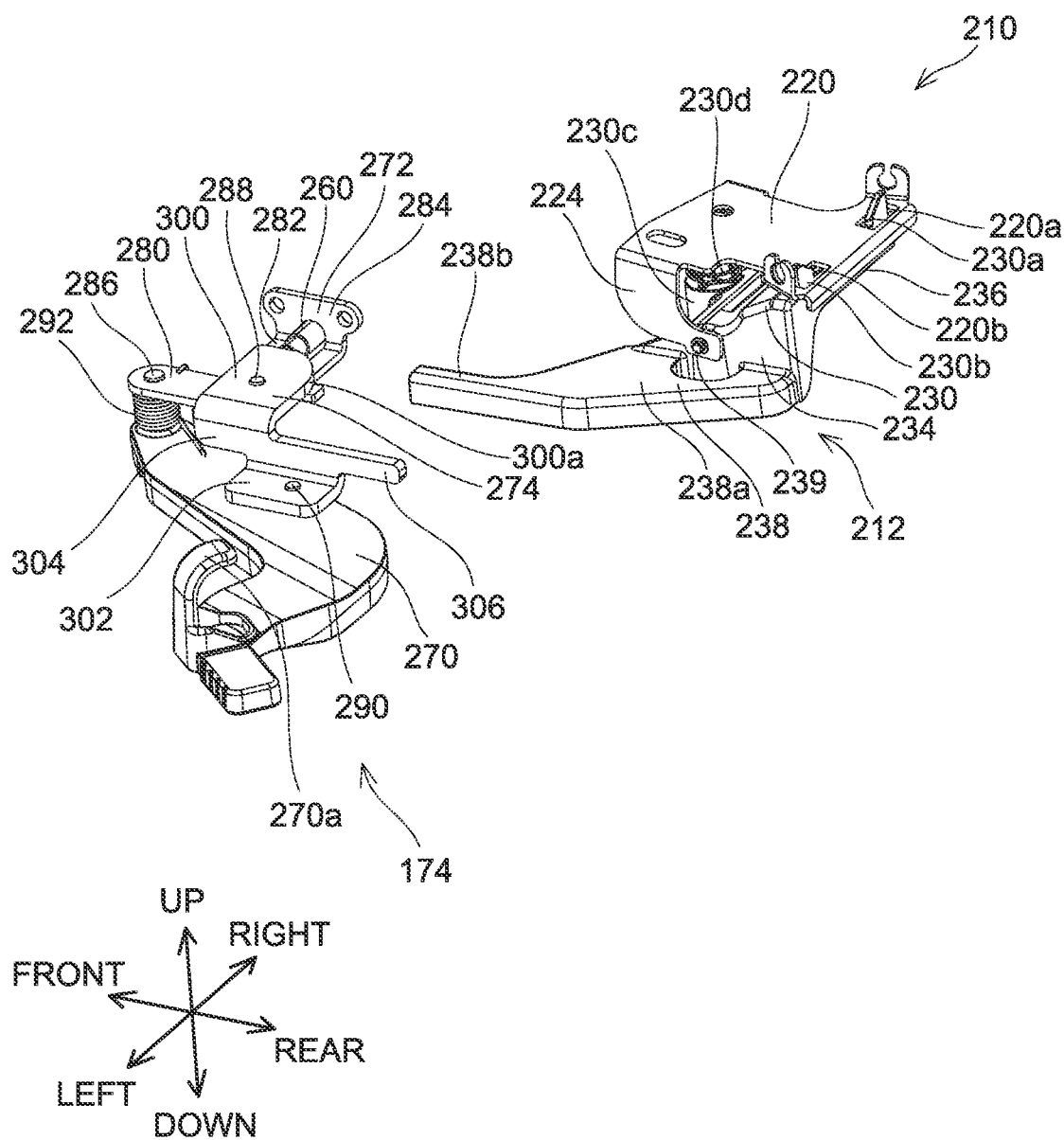
FIG. 17 is a perspective view of the support plate 210 and the rotary plate 212 in the state in which the brake lever 58 is pulled up, and the clutch operating mechanism 174 with a clutch operation lever 270 pulled out in the embodiment as viewed from the rear left upper side.

As shown in FIG. 17, when the clutch operation lever 270 is pulled out from the left frame pipe 154, the clutch operation lever 270 rotates in a direction by which it moves leftward, thus the coupling part 302 of the rod operation part 274 rotates about the rotation shaft 288 in a direction of moving leftward. By the coupling part 302 rotating in the direction of moving leftward, the cam 300 of the rod operation part 274 rotates in a direction by which the cam surface 300a moves the clutch rod 260 rightward. Due to this, as shown in FIG. 11, the clutch rod 260 is pressed into the gearbox 172, the selector 262 moves rightward, and the engaging protrusion 255a of the dog clutch 255 shifts to the state of not being engaged with the engaging recess 254a of the second gear 254. Due to this, the state of the clutch mechanism 256 is switched from the transmission state to the non-transmission state.

As shown in FIG. 21, under a situation in which the state of the clutch mechanism 256 (see FIG. 11) is the non-transmission state, the left end of the clutch operation lever 270 is positioned between the left front wheel 162 and the left rear wheel 326. Further, the left end of the clutch operation lever 270 is positioned on the left side of a left end of the wagon frame 502. In this case, as shown in FIG. 18, the user can see the left end of the clutch operation lever 270 while holding the right grip 32 and the left grip 52. That is, the user can acknowledge that the clutch mechanism 256 (see FIG. 11) is in the non-transmission state. On the other hand, when the clutch operation lever 270 is attached to the left frame pipe 154 as shown in FIG. 1, the user cannot see the left end of the clutch operation lever 270 while holding the right grip 32 and the left grip 52. The torsion spring 292 of the clutch operation lever 270 (see FIG. 12) as aforementioned biases the left end of the clutch operation lever 270 rightward when the left end of the clutch operation lever 270 is pulled out leftward beyond the left front wheel 162. Due to this, the left end of the clutch operation lever 270 is suppressed from being positioned on the left side of the left front wheel 162.

In one or more embodiments, as shown in FIGS. 2 and 10 to 13, the cart 2 (example of "working machine") comprises: the left front wheel 162 (example of "first ground-contact part") configured to contact the ground; the motor 170 (example of "driver") configured to drive the left front wheel 162; the clutch mechanism 256 configured to be switched between the transmission state in which the driving force from the motor 170 is transmitted to the left front wheel 162 and a non-transmission state in which the driving force from the motor 170 is not transmitted to the left front wheel 162; the clutch operating mechanism 174 (example of "clutch operation part") configured to switch the state of the clutch mechanism 256; the left front wheel brake 166 (example of "braking mechanism") configured to be switched between the braking state in which it is braking the left front wheel 162 and the non-braking state in which it is not braking the left front wheel 162; and the brake operating mechanism 56 (example of "braking operation part") configured to switch the state of the left front wheel brake 166. In the case where the state of the left front wheel 162 is the braking state, the clutch mechanism 256 can switch from the transmission state to the non-transmission state by operating the clutch operating mechanism 174, and in the case where the state of the left front wheel 162 is the non-braking state, the clutch mechanism 256 cannot switch from the transmission state to the non-transmission state even by operating the clutch operating mechanism 174. According to the above configuration, the state of the clutch mechanism 256 can be switched from the transmission state to the non-transmission state only when the state of the left front wheel brake 166 is the braking state, and the state of the clutch mechanism 256 cannot be switched from the transmission state to the non-transmission state if the state of the left front wheel brake 166 is the non-braking state. Due to this, upon when the state of the clutch mechanism 256 is switched from the transmission state to the non-transmission state, the brake is applied on the left front wheel 162 by the left front wheel brake 166. As such, even when the state of the clutch mechanism 256 is switched from the transmission state to the non-transmission state, the state in which the cart 2 is stopped can be maintained. Especially, the cart 2 is used for carrying heavy articles (such as a large amount of gravel). Due to this, it is preferable that the state in which the cart 2 is stopped is maintained even when the clutch mechanism 256 of the cart 2 parked on a slope is switched from the transmission state to the non-transmission state. According to the above configuration, the state in which the cart 2 is stopped is maintained even when the state of the clutch mechanism 256 is switched from the transmission state to the non-transmission state.

Further, in one or more embodiments, as shown in FIGS. 12 and 21, the clutch operating mechanism 174 is configured to switch the state of the clutch mechanism 256 from the transmission state to the non-transmission state in response to an operation by the user. For example, when the clutch operating mechanism 174 is configured to switch the clutch mechanism 256 from the transmission state to the non-transmission state using electric power, the state of the clutch mechanism 256 cannot be switched from the transmission state to the non-transmission state if an abnormality occurs in an electric power system related to the clutch operating mechanism 174. According to the above configuration, even when an abnormality occurs in a part of the electric power system related to the clutch operating mechanism 174, the user can manually operate the clutch operating mechanism 174 to switch the state of the clutch mechanism 256 from the transmission state to the non-transmission state. As such, user convenience can be improved.

Further, in one or more embodiments, as shown in FIG. 12, the clutch operating mechanism 174 comprises the clutch operation lever 270 configured to be operated by the user. The state of the clutch mechanism 256 is switched from the non-transmission state to the transmission state in response to an operation by the user on the clutch operation lever 270. According to the above configuration, the configuration for operating the clutch mechanism 256 can be simplified.

Further, in one or more embodiments, as shown in FIGS. 12 and 13, the brake operating mechanism 56 is configured to switch the state of the left front wheel brake 166 from the non-braking state to the braking state in response to an operation by the user. For example, when the brake operating mechanism 56 is configured to use electric power to switch the left front wheel brake 166 from the non-braking state to the braking state, the state of the left front wheel brake 166 cannot be switched from the non-braking state to the braking state if an abnormality occurs in an electric power system related to the brake operating mechanism 56, as a result of which the state of the clutch mechanism 256 cannot be switched from the transmission state to the non-transmission state. According to the above configuration, even when an abnormality occurs in the electric power system related to the brake operating mechanism 56, the user can switch the state of the left front wheel brake 166 from the non-braking state to the braking state, as a result of which the user can switch the state of the clutch mechanism 256 from the transmission state to the non-transmission state. As such, user convenience can be improved.

Further, in one or more embodiments, as shown in FIG. 2, the brake operating mechanism 56 comprises the brake lever 58 configured to be operated by the user. As shown in FIGS. 12 and 13, the state of the left front wheel brake 166 is switched from the non-braking state to the braking state in response to the operation by the user on the brake lever 58. According to the above configuration, the configuration for operating the left front wheel brake 166 can be simplified.

Further, in one or more embodiments, as shown in FIG. 2, the cart 2 further comprises the right handle 22 and the left handle 24 (examples of "grip") configured to be gripped by the user. In the case where the right handle 22 and the left handle 24 are gripped by the user and the state of the clutch mechanism 256 is the non-transmission state, the clutch operating mechanism 174 is disposed at the position where the left end of the clutch operating mechanism 174 (example of "at least a part of the clutch operation part") is visible to the user (see FIGS. 18 and 21), and in the case where the right handle 22 and the left handle 24 are gripped by the user and the state of the clutch mechanism 256 is the transmission state, the clutch operating mechanism 174 is disposed at the position where the clutch operating mechanism 174 is not visible to the user (see FIG. 1). According to the above configuration, the user can identify the state of the clutch mechanism 256 in accordance with whether the left end of the clutch operating mechanism 174 is visible. Thus, user convenience can be improved.

Further, in one or more embodiments, as shown in FIG. 21, the cart 2 further comprises the left rear wheel 326 (example of "second ground-contact part") disposed rearward of the left front wheel 162 and configured to contact the ground. In the case where the state of the clutch mechanism 256 is the non-transmission state, the left end of the clutch operating mechanism 174 is disposed between the left front wheel 162 and the left rear wheel 326. According to the above configuration, since the left end of the clutch operating mechanism 174 is arranged between the left front wheel 162 and the left rear wheel 326, the user can easily see at least a part of the clutch operating mechanism 174 (i.e., the left end of the clutch operating mechanism 174).

Further, in one or more embodiments, as shown in FIG. 18, the cart 2 further comprises the wagon frame 502 (example of "support frame"). In the case where the state of the clutch mechanism 256 is the non-transmission state, when the cart 2 is viewed from the above, the left end of the clutch operating mechanism 174 is disposed outside of the wagon frame 502. According to the above configuration, since the left end of the clutch operating mechanism 174 is disposed outside the wagon frame 502, the user can easily see the left end of the clutch operating mechanism 174.

(First Variant) The "working machine" is not limited to the cart 2, and may be a sprayer or a mower.

(Second Variant) The "ground-contact part" is not limited to wheel(s), but may be roller(s) or crawler(s) extending in the left-right direction.

(Third Variant) The cart 2 may comprise brake switch(es) configured to switch the states of the right front wheel brake 164 and the left front wheel brake 166 as a substitute to or in addition to the brake lever 58.

(Fourth Variant) The cart 2 may comprise a clutch switch configured to switch the state of the clutch mechanism 256 as a substitute to or in addition to the clutch operating mechanism 174.

(Fifth Variant) The right front wheel brake 164 and the left front wheel brake 166 may be electric parking brakes.

(Sixth Variant) At least a part of the clutch operating mechanism 174 may be visible to the user holding the right handle 22 and the left handle 24 in both the transmission state and the non-transmission state. In another variant, the clutch operating mechanism 174 may not be visible to the user holding the right handle 22 and the left handle 24 in both the transmission state and the non-transmission state.

(Seventh Variant) The cart 2 may not comprise the fixing lever 64.

(Eighth Variant) The cart 2 may comprise actuator(s) configured to switch the states of the right front wheel brake 164 and the left front wheel brake 166. In this variant, the controller 12b may control operation(s) of the actuator(s).

(Ninth Variant) The cart 2 may comprise an actuator configured to switch the state of the clutch mechanism 256. In this variant, the controller 12b may control an operation of the actuator.

What is claimed is:

1. A working machine comprising:
   a first ground-contact part configured to contact ground;
   a driver configured to drive the first ground-contact part;
   a clutch mechanism configured to be switched between a transmission state in which a driving force from the driver is transmitted to the first ground-contact part and a non-transmission state in which the driving force is not transmitted to the first ground-contact part;
   a clutch operation part configured to switch a state of the clutch mechanism;
   a braking mechanism configured to be switched between a braking state in which the braking mechanism is braking the first ground-contact part and a non-braking state in which the braking mechanism is not braking the first ground-contact part; and
   a braking operation part configured to switch a state of the braking mechanism,
   wherein in a case where the state of the braking mechanism is the braking state, the clutch mechanism can switch from the transmission state to the non-transmission state by operating the clutch operation part, and
   in a case where the state of the braking mechanism is the non-braking state, the clutch mechanism cannot switch from the transmission state to the non-transmission state even by operating the clutch operation part.

2. The working machine according to claim 1, wherein the clutch operation part is configured to switch the state of the clutch mechanism from the transmission state to the non-transmission state in response to an operation by a user.

3. The working machine according to claim 2, wherein the clutch operation part comprises a clutch operation lever configured to be operated by the user, and
the state of the clutch mechanism is switched from the non-transmission state to the transmission state in response to an operation by the user on the clutch operation lever.

4. The working machine according to claim 1, wherein the braking operation part is configured to switch the state of the braking mechanism from the non-braking state to the braking state in response to an operation by a user.

5. The working machine according to claim 4, wherein the braking operation part comprises a braking operation lever configured to be operated by the user, and
the state of the braking mechanism is switched from the non-braking state to the braking state in response to the operation by the user on the braking operation lever.

6. The working machine according to claim 1, further comprising:
a grip configured to be gripped by a user,
wherein in a case where the grip is gripped by the user and the state of the clutch mechanism is the non-transmission state, the clutch operation part is disposed at a position where at least a part of the clutch operation part is visible to the user, and
in a case where the grip is gripped by the user and the state of the clutch mechanism is the transmission state, the clutch operation part is disposed at a position where the clutch operation part is not visible to the user.

7. The working machine according to claim 6, further comprising:
a second ground-contact part disposed frontward or rearward of the first ground-contact part and configured to contact the ground,
wherein in a case where the state of the clutch mechanism is the non-transmission state, at least the part of the clutch operation part is disposed between the first ground-contact part and the second ground-contact part.

8. The working machine according to claim 6, further comprising:
a support frame,
wherein in a case where the state of the clutch mechanism is the non-transmission state, when the working machine is viewed from the above, at least the part of the clutch operation part is disposed outside of the support frame.

9. The working machine according to claim 1, wherein the working machine is a cart.

10. A working machine comprising:
a first ground-contact part configured to contact ground;
a driver configured to drive the first ground-contact part;
a clutch mechanism configured to be switched between a transmission state in which a driving force from the driver is transmitted to the first ground-contact part and a non-transmission state in which the driving force is not transmitted to the first ground-contact part;
a clutch operation part configured to switch a state of the clutch mechanism;
a braking mechanism configured to be switched between a braking state in which the braking mechanism is braking the first ground-contact part and a non-braking state in which the braking mechanism is not braking the first ground-contact part; and
a braking operation part configured to switch a state of the braking mechanism,
wherein in a case where the state of the braking mechanism is the braking state, the clutch mechanism can switch from the transmission state to the non-transmission state by operating the clutch operation part, and
in a case where the state of the braking mechanism is the non-braking state, the clutch mechanism cannot switch from the transmission state to the non-transmission state even by operating the clutch operation part,
wherein the clutch operation part is configured to switch the state of the clutch mechanism from the transmission state to the non-transmission state in response to an operation by a user,
wherein the clutch operation part comprises a clutch operation lever configured to be operated by the user,
the state of the clutch mechanism is switched from the non-transmission state to the transmission state in response to an operation by the user on the clutch operation lever,
wherein the braking operation part is configured to switch the state of the braking mechanism from the non-braking state to the braking state in response to an operation by a user,
wherein the braking operation part comprises a braking operation lever configured to be operated by the user,
the state of the braking mechanism is switched from the non-braking state to the braking state in response to the operation by the user on the braking operation lever,
wherein the working machine further comprises a grip configured to be gripped by a user,
in a case where the grip is gripped by the user and the state of the clutch mechanism is the non-transmission state, the clutch operation part is disposed at a position where at least a part of the clutch operation part is visible to the user,
in a case where the grip is gripped by the user and the state of the clutch mechanism is the transmission state, the clutch operation part is disposed at a position where the clutch operation part is not visible to the user,
wherein the working machine further comprises a second ground-contact part disposed frontward or rearward of the first ground-contact part and configured to contact the ground,
wherein in a case where the state of the clutch mechanism is the non-transmission state, at least the part of the clutch operation part is disposed between the first ground-contact part and the second ground-contact part,
wherein the working machine further comprises a support frame, and
in a case where the state of the clutch mechanism is the non-transmission state, when the working machine is viewed from the above, at least the part of the clutch operation part is disposed outside of the support frame.

* * * * *